United States Patent
Abe et al.

(10) Patent No.: US 9,448,657 B2
(45) Date of Patent: Sep. 20, 2016

(54) DISPLAY DEVICE

(71) Applicant: Japan Display Inc., Tokyo (JP)

(72) Inventors: Hiroyuki Abe, Tokyo (JP); Hideo Sato, Tokyo (JP); Takayuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/485,917

(22) Filed: Sep. 15, 2014

(65) Prior Publication Data

US 2015/0084920 A1 Mar. 26, 2015

(30) Foreign Application Priority Data

Sep. 20, 2013 (JP) .................................. 2013-195661

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01)

(58) Field of Classification Search
CPC .... G06F 3/044; G06F 3/0412; G06F 3/0416; G02F 1/13338
See application file for complete search history.

(56) References Cited

U.S. PATENT DOCUMENTS

| 8,274,500 B2 | 9/2012 | Abe et al. | |
| 8,384,704 B2 | 2/2013 | Maki et al. | |
| 2003/0011584 A1* | 1/2003 | Azami | G09G 3/3258 345/204 |
| 2007/0285959 A1* | 12/2007 | Yamazaki | B82Y 10/00 365/108 |
| 2012/0262387 A1* | 10/2012 | Mizuhashi | G06F 3/044 345/173 |

FOREIGN PATENT DOCUMENTS

| JP | 2011-039144 A | 2/2011 |
| JP | 2012-221485 A | 11/2012 |
| JP | 2012-230657 A | 11/2012 |

* cited by examiner

*Primary Examiner* — Shaheda Abdin
(74) *Attorney, Agent, or Firm* — Ulmer & Berne LLP

(57) ABSTRACT

A drive circuit of an in cell type touch panel includes a thin film transistor that controls whether to pass a signal to drive a counter electrode when a finger touches and a thin film transistor that controls whether to pass a counter electrode voltage in display. The drive circuit raises a gate voltage applied to the thin film transistor when the drive signal is passed more than a gate voltage applied to the thin film transistor when the counter electrode voltage is passed.

20 Claims, 14 Drawing Sheets

DISPLAY DEVICE

CLAIM OF PRIORITY

The present application claims priority from Japanese Patent Application JP2013-195661 filed on Sep. 20, 2013, the content of which is hereby incorporated by reference into this application.

BACKGROUND

The present disclosure relates to a display device, and to a technique applicable to a display device including a touch panel in the inside of the display device, for example.

A liquid crystal display device has a liquid crystal display panel, and the liquid crystal display panel has a configuration in which a liquid crystal composition is encapsulated between two substrates. Moreover, such a liquid crystal display device is mass-produced in which a touch panel is disposed as an input device on the front face of the liquid crystal display panel. Such a liquid crystal display device is proposed in which a change in capacitance or in a resistance value is used for detecting an input to the touch panel (in the following, referred to as a touch).

The touch panel that detects a change in the electrostatic capacitance is one that detects a change in the electrostatic capacitance between two electrodes disposed through an insulating film, which is referred to as an electrostatic capacitive touch panel below. In the electrostatic capacitive touch panel, a so-called in cell type display panel is proposed in which a common electrode (a counter electrode) for display originally provided on the display panel is also used for one of a pair of touch sensor electrodes and the other electrode (a touch detecting electrode) is disposed so as to cross this common electrode.

It is noted that when prior art search was performed after the present invention was made, Japanese Unexamined Patent Application Publication No. 2012-230657, Japanese Unexamined Patent Application Publication No. 2012-221485, and US Patent Application Publication No. 2012/0262387 were extracted as related techniques. Japanese Unexamined Patent Application Publication No. 2012-230657 is an application that claims priority. Japanese Unexamined Patent Application Publication No. 2012-221485 is a divisional application. Both techniques have the same original patent application. Moreover, US Patent Application Publication No. 2012/0262387 is an application that claims priority under the Paris Convention whose basic applications are the original patent application of Japanese Unexamined Patent Application Publication No. 2012-230657 (the original patent application of Japanese Unexamined Patent Application Publication No. 2012-221485) and Japanese Unexamined Patent Application Publication No. 2012-230657. Japanese Unexamined Patent Application Publication No. 2012-230657 discloses that a display device is provided with a touch detecting function and a driver for a drive signal drive electrode is formed on a TFT substrate using a TFT element to supply two direct current drive signals to the drive electrode of the display device. Japanese Unexamined Patent Application Publication No. 2012-221485 discloses a driver for a drive signal drive electrode that supplies an alternating current drive signal and a direct current drive signal to the drive electrode of a display device provided with a touch detecting function.

SUMMARY

The inventors investigated the drive circuit that drives the counter electrode of the in cell type display panel, and as a result, the inventors found problems below.

In other words, when the drive circuit is built in a COG-mounted driver IC, an interconnection from the driver IC to the counter electrode is prolonged and a signal-to-noise ratio becomes small. When the drive circuit is formed on a TFT substrate near the counter electrode using a CMOS (complementary) thin film transistor, the manufacture processes become complicated. When the drive circuit is formed on the TFT substrate near the counter electrode using a single-channel thin film transistor, the drive power becomes small.

The other problems and novel characteristics will be apparent from the description and the accompanying drawings of the present disclosure.

The flowing is a brief description of the outline of a representative aspect of the present disclosure.

In other words, a drive circuit of an in cell type touch panel includes a thin film transistor that controls whether to pass a signal to drive a counter electrode when a finger touches and a thin film transistor that controls whether to pass a counter electrode voltage in display. The drive circuit raises a gate voltage applied to the thin film transistor when the drive signal is passed more than a gate voltage applied to the thin film transistor when the counter electrode voltage is passed.

According to the drive circuit, it is possible to improve the drive power of the drive circuit formed of a single-channel thin film transistor.

DESCRIPTION OF THE PREFERRED EMBODIMENT

Figure 1:
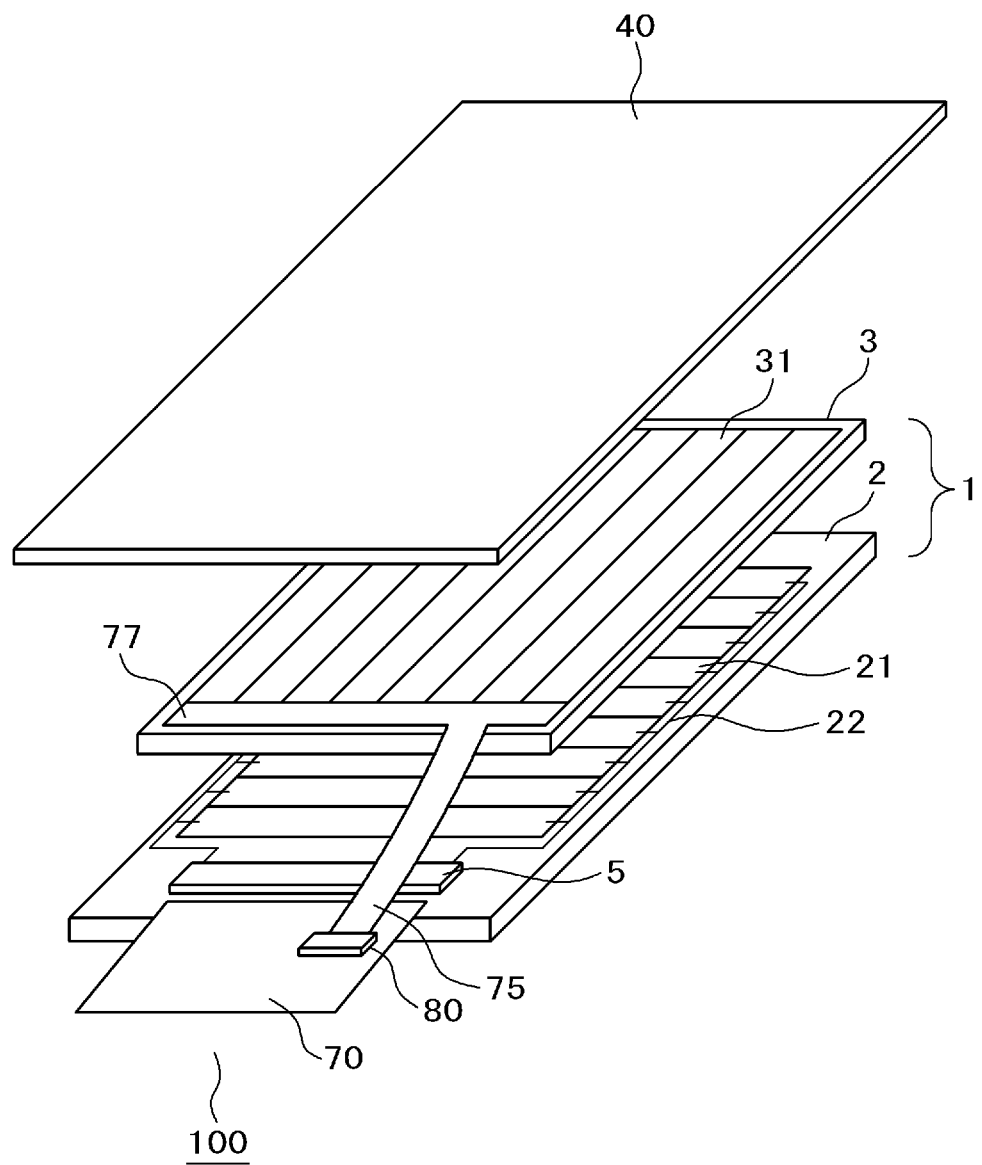
FIG. 1 is a schematic diagram of the basic configuration of a liquid crystal display device investigated prior to the present disclosure.

In the following, an embodiment, an example, and exemplary modifications will be described with reference to the drawings. It is noted that in all the drawings for explaining the embodiment, the example, and the exemplary modifications, components having the same functions are designated the same reference numerals and signs, and the overlapping description is omitted.

1. A Technique Investigated Prior to the Present Disclosure

FIG. 1 is a schematic diagram of the basic configuration of a liquid crystal display device investigated prior to the present disclosure. As illustrated in FIG. 1, a liquid crystal display device 100 includes a liquid crystal display panel 1, a drive circuit 5, a flexible substrate 70, a front panel 40, a housing case (not illustrated), and a backlight (not illustrated).

The liquid crystal display panel 1 is configured in which the TFT substrate 2 is laid over the color filter substrate 3 spaced with a predetermined gap, both of the substrates are bonded to each other with a sealing material (not illustrated) in a frame shape provided near the peripheral portion between both of the substrates, a liquid crystal composition is filled and encapsulated in the inner side of the sealing material, and a polarizer is attached to the outer sides of both of the substrates.

The TFT substrate 2 is provided with a counter electrode 21 and a counter electrode signal line 22 connected from the drive circuit 5 to the counter electrode 21. A counter electrode signal is transmitted from the drive circuit 5 to the counter electrode 21 through the counter electrode signal line 22. The color filter substrate 3 is provided with a detection electrode 31, and the detection electrode 31 is connected to a flexible substrate 75 at a connecting portion 77. The flexible substrate 75 is connected to the flexible substrate 70 through a connector 80. The detection electrode 31 transmits a detection signal to the drive circuit 5 through the flexible substrate 75, the connector 80, and the flexible substrate 70.

It is noted that the liquid crystal display panel 1 has a display unit including a large number of pixels in a matrix configuration (the detail will be described later). The counter electrode 21 is disposed on the TFT substrate 2 as facing the pixel electrode in the pixel. In other words, the liquid crystal display panel 1 is operated by a lateral electric field system such as FFS (Fringe Field Switching) and IPS (In Plane Switching). A voltage is applied across both of the electrodes, and the orientation of liquid crystal molecules is changed. In association with the change in the orientation of the liquid crystal molecules, the optical transmittance is changed, and an image is displayed.

Figure 2:
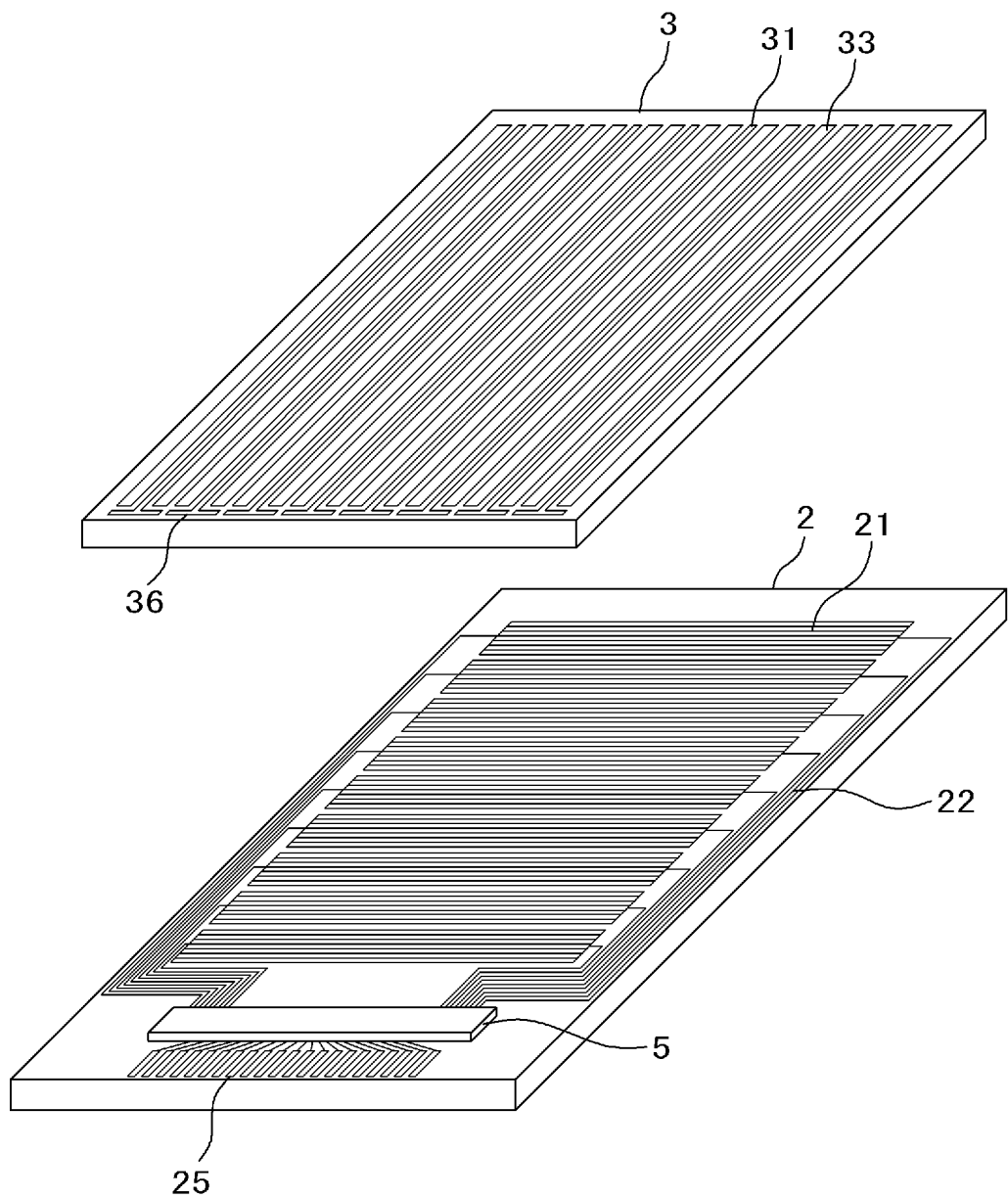
FIG. 2 is a diagram of the relationship between a counter electrode and a detection electrode.

Next, the counter electrode 21 and the detection electrode 31 will be described with reference to FIG. 2. As discussed above, the counter electrode 21 is provided on the TFT substrate 2. A plurality (about 20 electrodes, for example) of the counter electrodes 21 (a counter electrode block) is connected at both ends in a shared manner, and connected to the counter electrode signal line 22. A counter electrode signal is supplied from the drive circuit 5 to a bundle of the counter electrodes 21. The counter electrode signal includes a counter voltage used for displaying an image and a drive signal used for detecting a touch.

When a drive signal is applied to the counter electrode 21, a detection signal is generated on the detection electrode 31 disposed at a predetermined gap from the counter electrode 21 and configuring a capacitance. The detection signal is externally extracted through a detection electrode terminal 36.

It is noted that a dummy electrode 33 is formed on both sides of the detection electrode 31. The dummy electrode 33 is not electrically connected to any of electrodes and interconnections. The detection electrode 31 faces the dummy electrode 33 side at one end portion and forms the detection electrode terminal 36 in a T-shape. Moreover, on the TFT substrate 2, various interconnections and terminals are formed such as a drive circuit input terminal 25 other than the counter electrode signal line 22.

Figure 3:
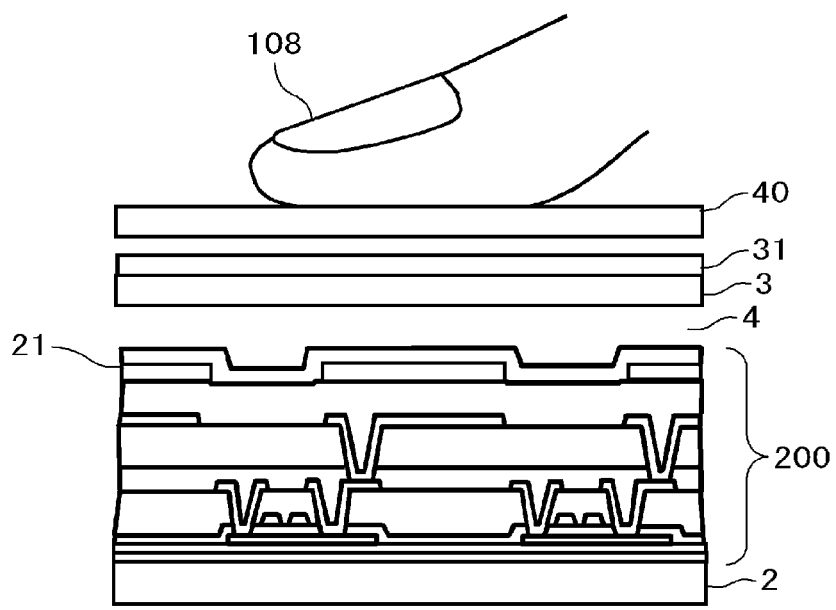
FIG. 3 is a schematic cross sectional view enlarging a part of a cross section of a display unit.

FIG. 3 is a schematic cross sectional view enlarging a part of a cross section of the display unit. As illustrated in FIG. 3, the TFT substrate 2 is provided with a pixel portion 200, and the counter electrode 21 is used for displaying an image as a part of a pixel. Moreover, a liquid crystal composition 4 is sandwiched between the TFT substrate 2 and the color filter substrate 3. The detection electrode 31 provided on the color filter substrate 3 and the counter electrode 21 provided on the TFT substrate 2 form a capacitance. When a drive signal is applied to the counter electrode 21, the voltage of the detection electrode 31 is changed. At this time, as illustrated in FIG. 3, when a conductor such as a finger 108 comes close to or touches the front panel 40, the capacitance is changed, and a voltage generated on the detection electrode 31 is changed as compared with the case where the conductor does not come close to or touch the front panel 40.

As described above, a change in the capacitance generated between the counter electrode 21 and the detection electrode 31 formed on the liquid crystal display panel 1 is detected, so that a touch panel function can be provided on the liquid crystal display panel 1.

In the display panel 1, the drive circuit 5 mounted in COG (Chip On Glass) directly drives the counter electrodes 21 through a long counter electrode signal line 22. The long counter electrode signal line 22 reduces the signal-to-noise ratio.

When a pixel transistor provided on the pixel regions of the liquid crystal display device is configured of a low temperature polysilicon (LTPS), the resolution and the transmittance can be improved. When a low temperature polysilicon is adopted as a semiconductor used for a counter electrode drive circuit, the counter electrode drive circuit can be formed on the picture frame region of an inexpensive glass substrate (the TFT substrate). Thus, the low temperature polysilicon is used presently. In the low temperature polysilicon, laser annealing is performed at a temperature of 600° C. or less in order to change the crystal structure to a polycrystal substance in the manufacture processes. However, since an electric current is highly likely interfered at the crystalline interface in the low temperature polysilicon, it is likely that the electron mobility is lower than the electron mobility of a high temperature polysilicon, and the drive power of the transistor is reduced, causing an adverse effect on display quality and touch detection.

It can also be considered that a CMOS transistor of a high drive power is used for the drive circuit for the counter electrode. However, the CMOS transistor has a flaw that complicated manufacture processes are necessary (costs are expensive).

Therefore, the inventors investigated to form a drive circuit for a counter electrode which reduces the degradation of the drive power of a transistor on the picture frame region of a TFT substrate while using a single-channel transistor.

2. Embodiment

Figure 4:
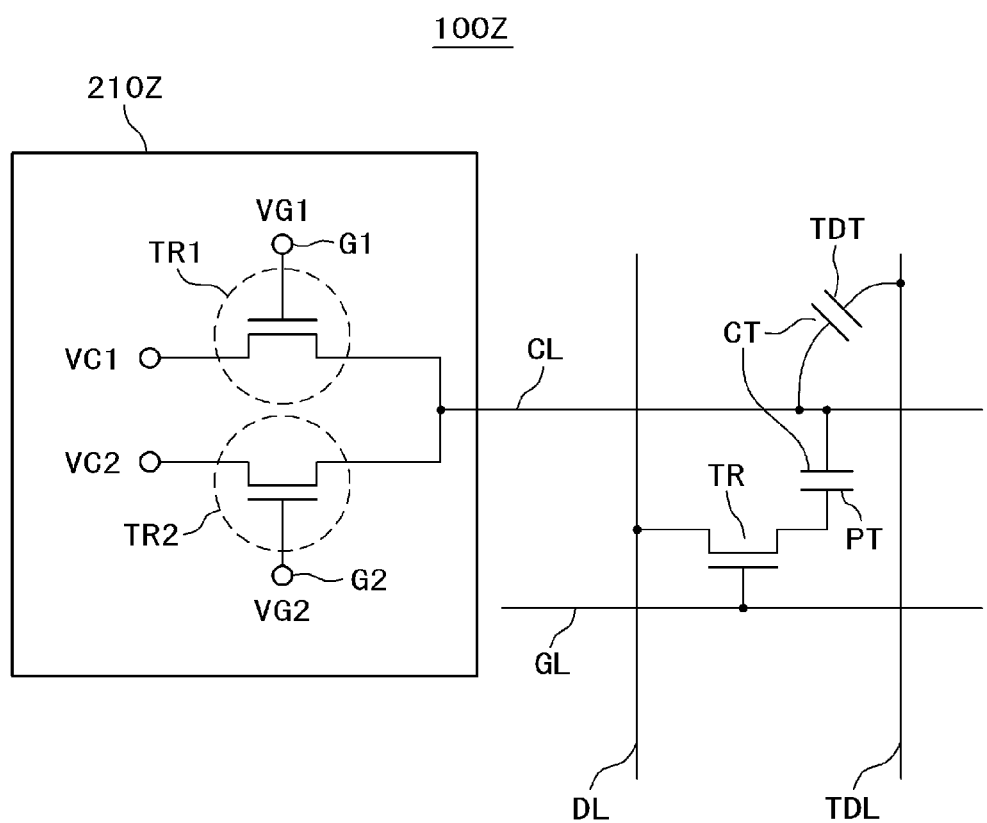
FIG. 4 is a diagram of a display device according to an embodiment.

FIG. 4 is a diagram of a display device according to an embodiment. A display device 100Z includes an electrode CT that is shared by a display electrode and a touch sensing electrode and a drive circuit 210Z that drives the electrode CT. The drive circuit 210Z includes a first thin film transistor TR1 connected to the electrode CT and a second thin film transistor TR2 connected to the electrode CT. The first thin film transistor TR1 and the second thin film transistor TR2 are single-channel thin film transistors. The first thin film transistor TR1 conducts electricity when using the electrode CT for sensing a touch, and transmits a first signal VC1 to the electrode CT. The second thin film transistor TR2 conducts electricity when using the electrode CT for display, and transmits a second signal VC2 to the electrode CT. A voltage VG1 applied to a gate electrode G1 of the first thin film transistor TR1 when the first signal VC1 is transmitted through the first thin film transistor TR1 is greater than a voltage VG2 applied to a gate electrode G2 of the second thin film transistor TR2 when the second signal VC2 is transmitted through the second thin film transistor TR2.

In other words, the drive circuit 210Z of an in cell type touch panel includes the thin film transistor TR1 that controls whether to pass the signal VC1 that drives the counter electrode CT when a finger touches and the thin film transistor TR2 that controls whether to pass the counter electrode voltage VC2 in display. The drive circuit 210Z raises the gate voltage VG1 applied to the thin film transistor TR1 when the drive signal VC1 is passed more than the gate voltage VG2 applied to the thin film transistor TR2 when the counter electrode voltage VC2 is passed.

The voltage VG1 applied to the gate electrode G1 of the first thin film transistor TR1 is raised when the signal VC1 is transmitted through the first thin film transistor TR1, so that the drive power can be improved even through a single-channel thin film transistor is used. The voltage VG1 applied to the gate electrode G1 is raised only on the first thin film transistor TR1 side, so that the circuit scale can be made smaller. The drive circuit can be configured without using a CMOS thin film transistor, so that the manufacture processes can be simplified. The drive circuit 210Z for the electrode CT is formed on the picture frame region of the TFT substrate, so that the interconnection length between the drive circuit 210Z and the electrode CT is shortened, and the signal-to-noise ratio can be improved.

It is noted that an electrode line CL is connected to the electrode CT. A thin film transistor TR and a pixel electrode PT are included in the portion surrounded by a gate line GL and a drain line DL. A detection electrode TDT is connected to a detection electrode signal line TDL.

Example

In this example, a liquid crystal display device is taken and described as an example. However, the example is also applicable to display devices in other modes such as an organic electroluminescent display device. A circuit that drives a counter electrode according to the example is applicable to a circuit that drives a cathode electrode of an organic electroluminescent display device, for example.

<Overall Structure>

Figure 5:
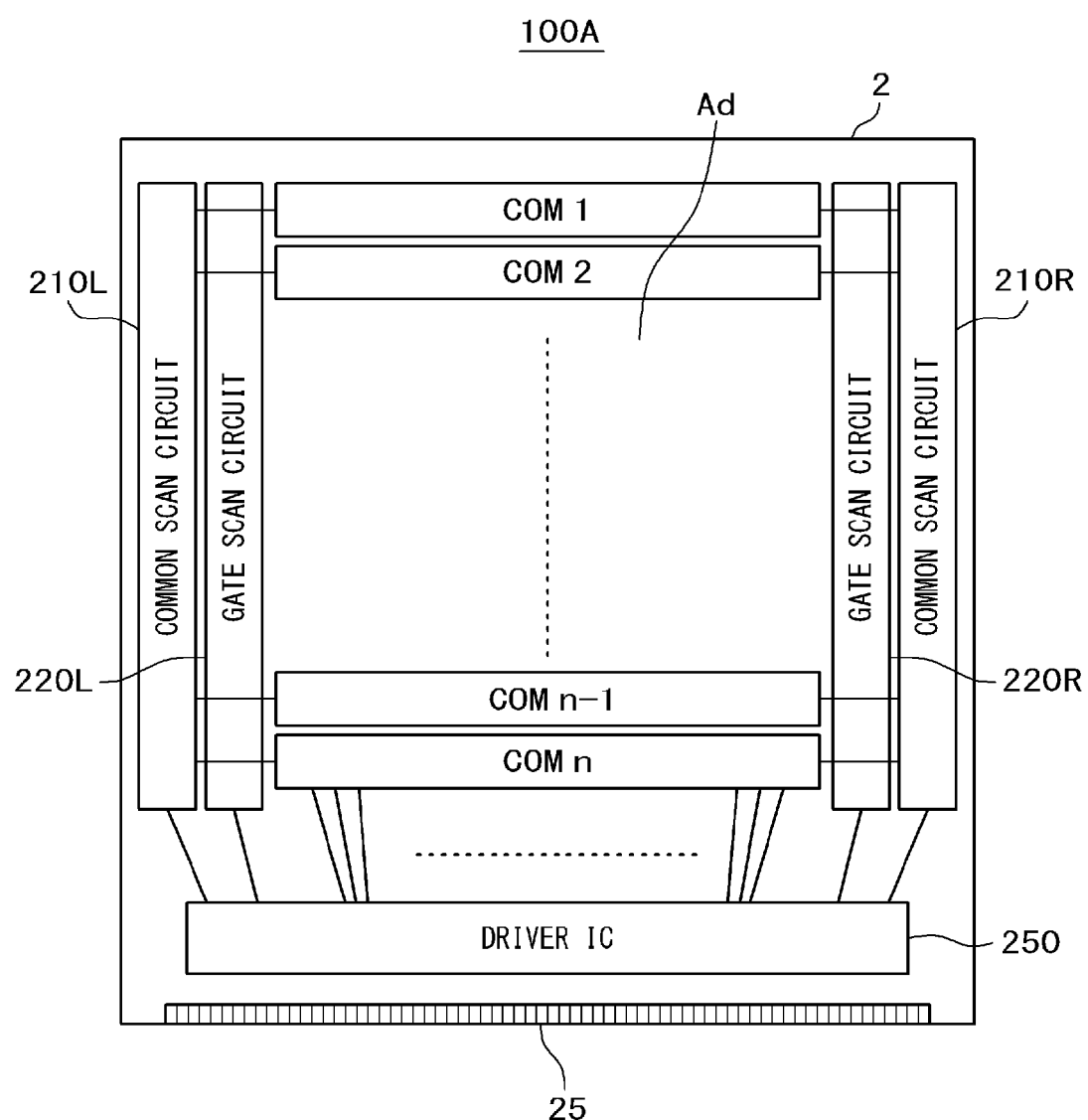
FIG. 5 is a schematic diagram of an example of mounting a display device according to an example.

FIG. 5 is a schematic diagram of an example of mounting the display device according to the example. A driver IC 250 is mounted on a TFT substrate 2 in COG, and sends an image signal to pixels, not illustrated, which are disposed in a display region Ad in a matrix configuration, through an interconnection. A gate scan circuit (a gate drive circuit) 220 (220R and 220L) is formed near the pixel portion (the display region) Ad on the TFT substrate 2 using a TFT element. In this example, in FIG. 5, the gate scan circuit 220R is disposed on the right side of the TFT substrate 2, the gate scan circuit 220L is disposed on the left side, and the gate scan circuits are supplied with a control signal or the like from the driver IC 250 through the interconnection. The gate scan circuits can drive pixels, not illustrated, which are disposed in the pixel portion Ad in a matrix configuration, from both sides.

A common scan circuit (a counter electrode drive circuit) 210 (210R and 210L) is formed on the TFT substrate 2 using a TFT element. In this example, in FIG. 5, the common scan circuit 210R is disposed on the right side of the TFT substrate 2, the common scan circuit 210L is disposed on the left side, and the common scan circuits are supplied with the signal of a drive signal line VCOMAC, VCOMDC, or the like from the driver IC 250 through the interconnection. The counter electrode drive circuits 210R and 210L can drive a plurality of counter electrode blocks COM1, COM2, . . . COMn−1, and COMn arranged side by side from both sides.

It is noted that a display device 100A has the same configuration as the configuration of the display device 100 (FIGS. 1, 2, and 3) except the points below. In the display device 100, the drive circuit 5 drives the counter electrode 21. On the other hand, in the display device 100A, the common scan circuit 210 formed on the TFT substrate 2 drives the counter electrode blocks. In the display device 100, the drive circuit 5 drives the gate line. On the other hand, in the display device 100A, the gate scan circuit 220 formed on the TFT substrate 2 drives the gate line. Therefore, although a part of the function is different between the drive circuit 5 and the driver IC 250, the circuit that drives the drain line, the circuit that receives a touch detection signal, and the like are the same.

Figure 6A:
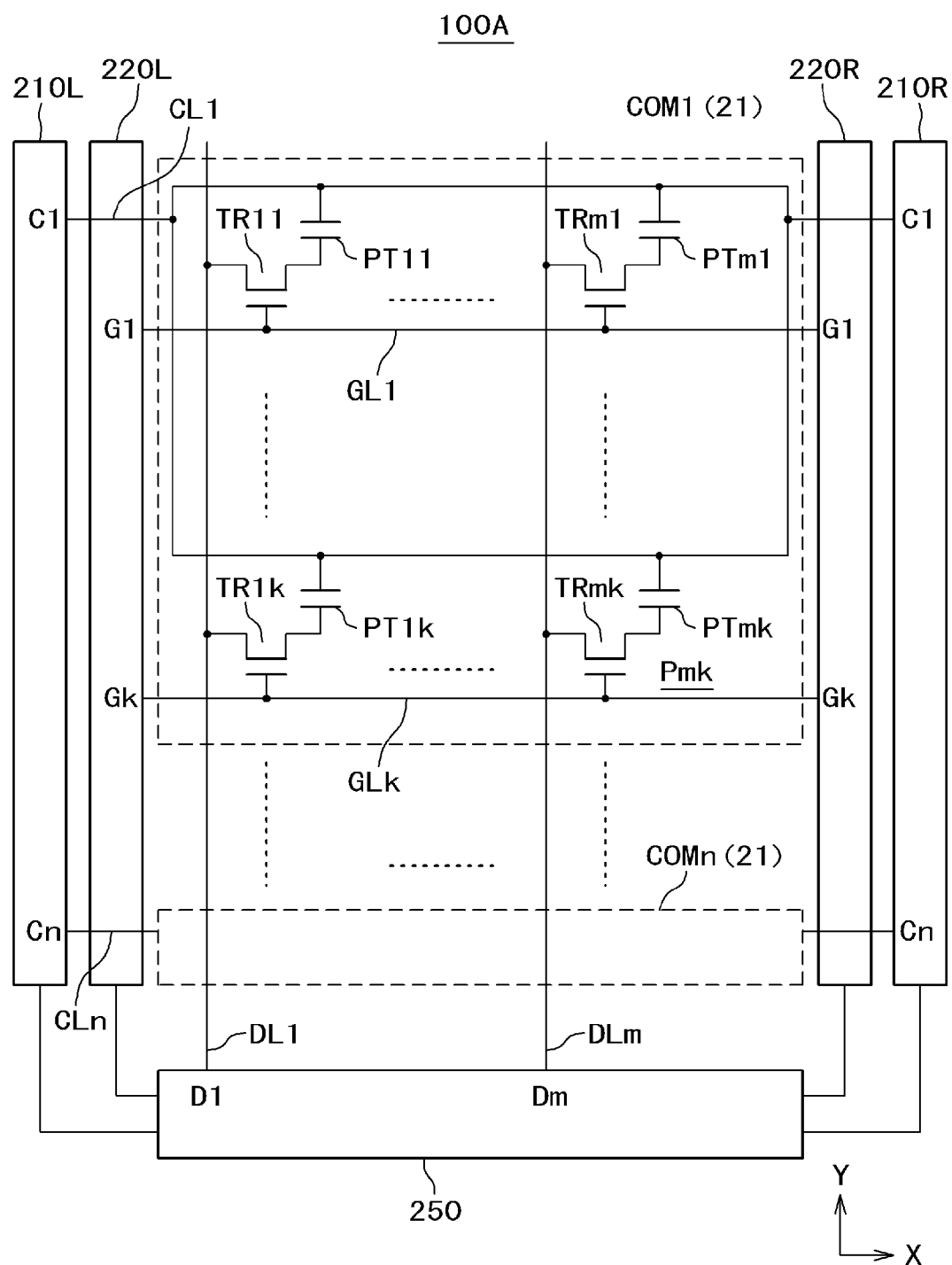
FIG. 6A is a block diagram of a portion formed on a TFT substrate of the display device according to the example.
Figure 6B:
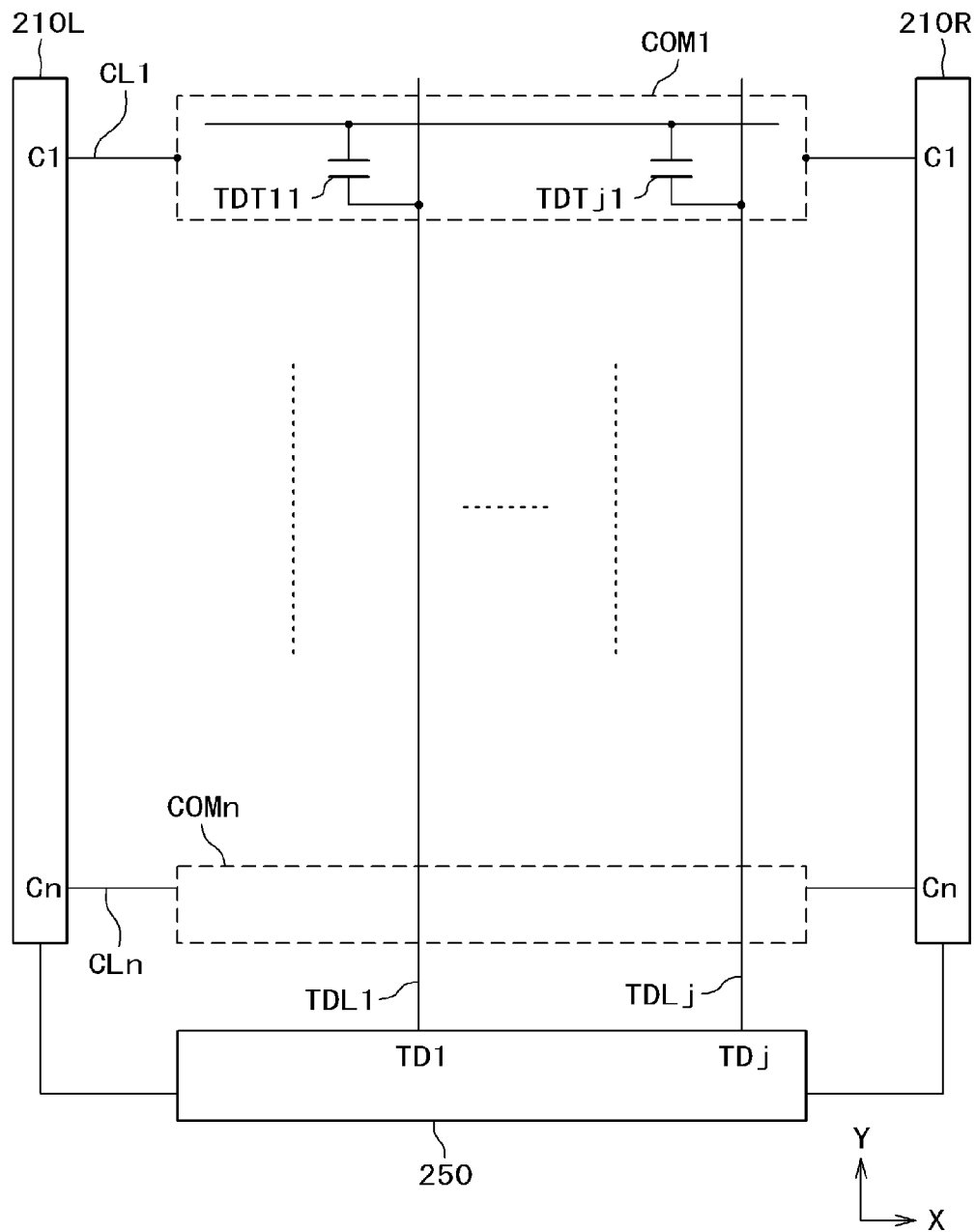
FIG. 6B is a block diagram of a touch detecting portion of the display device according to the example.

FIGS. 6A and 6B are block diagrams of the display device according to the example. FIG. 6A is a block diagram of a portion formed on the TFT substrate. FIG. 6B is a block diagram of a touch detecting portion. As illustrated in FIG. 6A, (n×k) of gate lines GL1 to GLnk and n of counter electrode signal lines (common lines) CL1 to CLn are provided on the TFT substrate 2 as extending in the X-direction (in the lateral direction in FIG. 6A), and m of drain lines DL1 to DLm are provided as extending in the Y-direction (in the vertical direction in FIG. 6A) perpendicular to the X-direction. Here, for an example, n is 20. The counter electrode blocks COM1 to COMn are each configured of k of counter electrode lines (corresponding to the counter electrode 21 in FIGS. 1, 2, and 3) as extending in the X-direction.

A region surrounded by the adjacent gate lines and the adjacent drain lines including the gate line GLk and the drain line DLm is a pixel region Pmk. In the pixel region Pmk, a thin film transistor (TFT) TRmk and a pixel electrode PTmk are provided. The drain of the thin film transistor TRmk is connected to the drain line DLm, the gate is connected to the gate line GLk, and the source is connected to the pixel electrode PTmk. Moreover, the counter electrode COM1 (21) is provided apart from the pixel electrode PTmk, and the counter electrode COM1 (21) is connected to the counter electrode signal line CL1. The pixel region exists in a region surrounded by the adjacent gate lines and the drain lines, not limited to the pixel region Pmk. Thus, m n×k of pixel electrodes exist. The counter electrodes COM1, COM2, . . . , COMn−1, and COMn are shared by m×k of pixels.

In the display device 100A, the common scan circuits 210L and 210R are provided on left and right picture frames, respectively, and the common scan circuits 210L and 210R drive the counter electrode signal lines CL1 to CLn extending in the lateral direction in parallel with each other from the left and right ends. The gate drive circuits 220L and 220R are also provided on the left and right picture frames, respectively, and the gate drive circuits 220L and 220R drive the gate lines GL1 to GLnk extending in the lateral direction in parallel with each other from the left and right ends. Furthermore, the driver IC 250 is provided on a lower picture frame of the display device 100A, and the driver IC 250 drives the drain lines DL1 to DLm extending in the vertical direction in parallel with each other from the lower end.

As illustrated in FIG. 6B, j of detection electrode signal lines TDL1 to TDLj (corresponding to the detection electrode 31 in FIGS. 1, 2, and 3) are provided on a color filter substrate 3 as extending in the Y-direction (in the vertical direction FIG. 6B). Signals (TD1 to TDj) from the detection electrode signal lines TDL1 to TDLj are inputted to the driver IC 250. The driver IC 250 includes a detection circuit (not illustrated) that detects a touch. The detection circuit includes an integrating circuit, a sample-and-hold circuit, an A/D conversion circuit, a memory, a CPU, etc. It is noted that the detection circuit may be configured as a separate IC (an integrated circuit) from the driver IC 250.

It is noted that transistors for use in the display device 100A are all N-channel thin film transistors (single-channel thin film transistors) configured of a low temperature polysilicon, and the common scan circuits 210L and 210R and the gate drive circuits 220L and 220R are formed on the picture frame regions of the TFT substrate 2.

<Common Scan Circuit>

Figure 7:
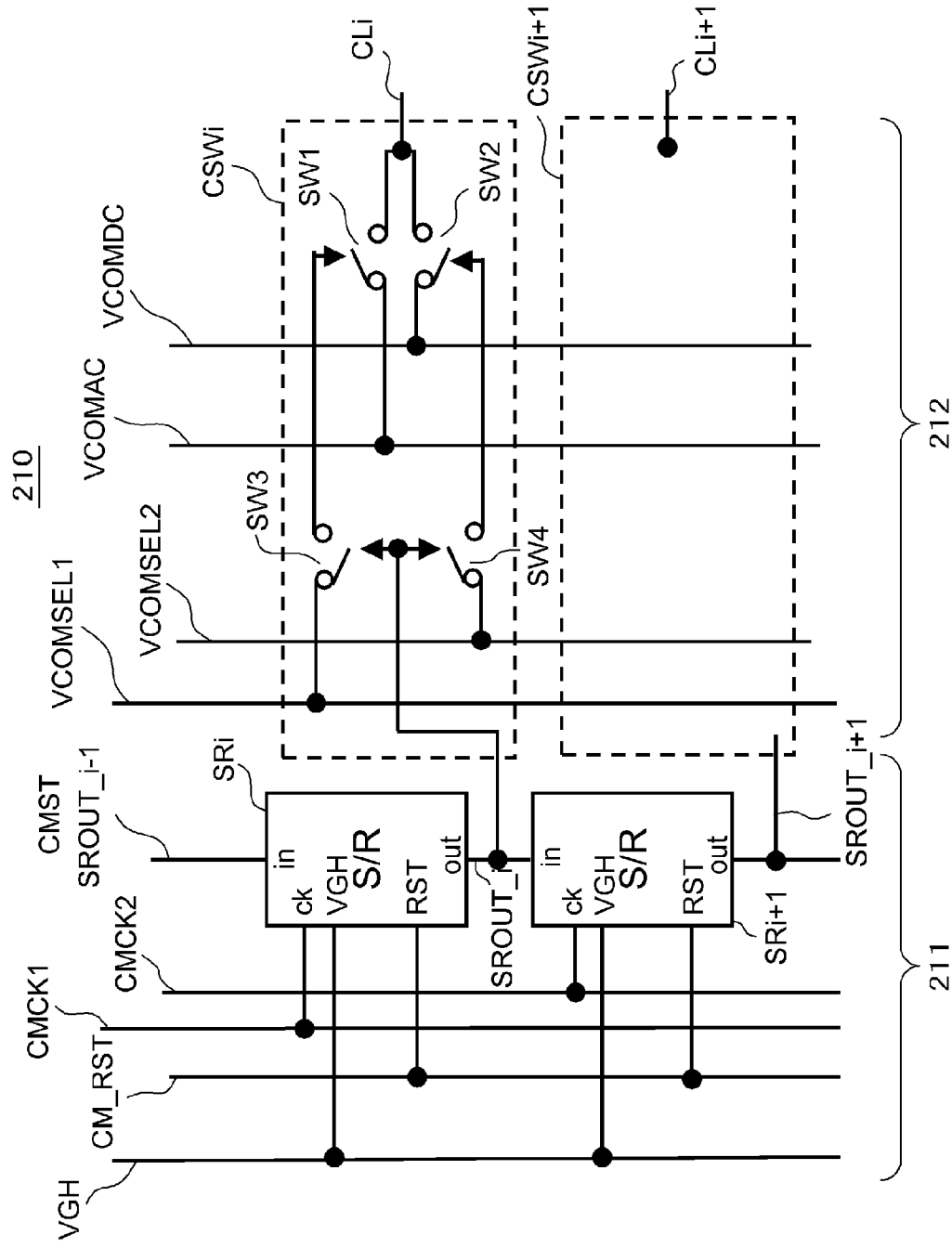
FIG. 7 is a block diagram of a common scan circuit according to the example.

FIG. 7 is a block diagram of the common scan circuit according to the example. The common scan circuit 210 includes a shift register unit 211 and a switch unit 212. The shift register unit 211 includes n of shift registers SRi (i=1 to n). In the shift register unit 211, the shift register SRi is connected in column through an output signal line SROUTi.

The switch unit 212 includes n of switch circuits CSWi (i=1 to n). The switch circuit CSWi includes switches SW1, SW2, SW3, and SW4. One end of the switch SW1 is connected to one end of the switch SW2, and connected to the counter electrode signal line CLi (i=1 to n). An alternating current drive signal line VCOMAC is connected to the other end of the switch SW1. A direct current drive signal line VCOMDC is connected to the other end of the switch SW2. One end of the switch SW3 controls the switch SW1. A first select signal line VCOMSEL1 is connected to the other end of the switch SW3. One end of the switch SW4 controls the switch SW2. The other end of the switch SW4 receives the signal of a second select signal line VCOMSEL2. With this configuration, the signal of the alternating current drive signal line VCOMAC or the direct current drive signal line VCOMDC is applied to the counter electrode block COMi through the counter electrode signal line CLi based on the signals of the first select signal line VCOMSEL1 and the second select signal line VCOMSEL2.

Figure 8:
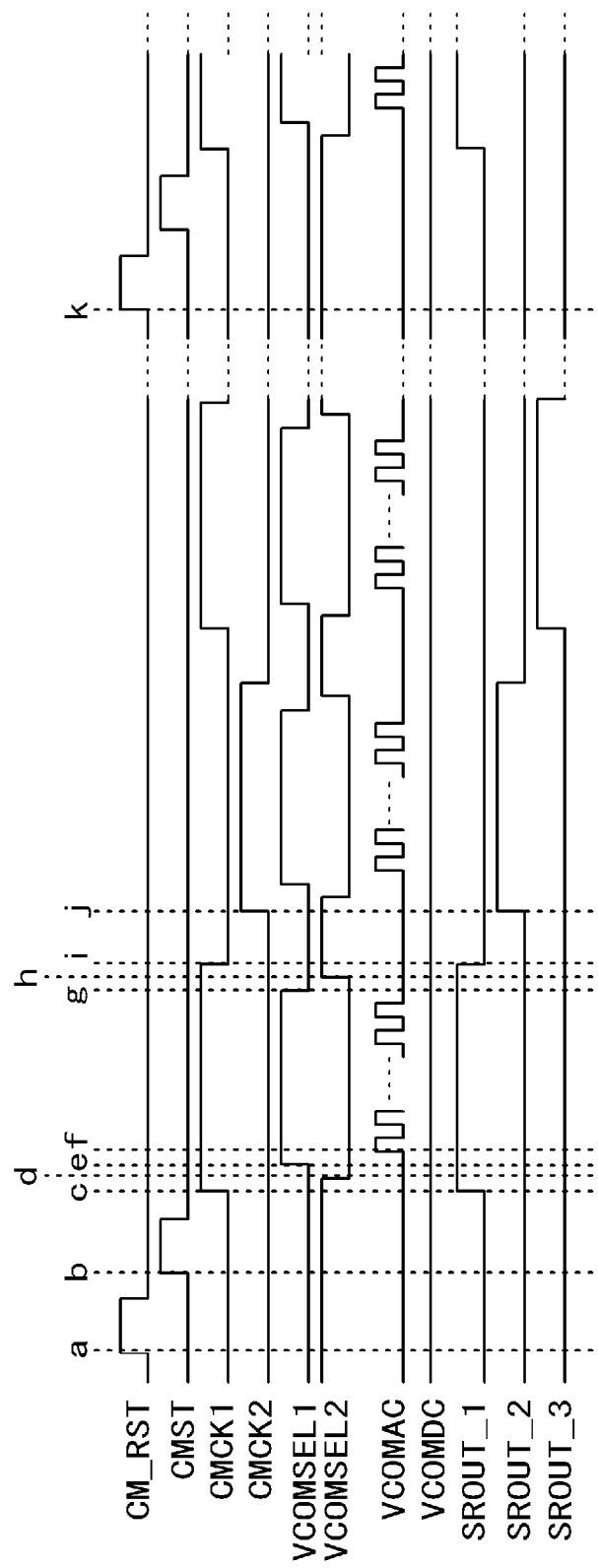
FIG. 8 is a timing chart of the operation of the common scan circuit according to the example.

FIG. 8 is a timing chart of the operation of the common scan circuit according to the example. The common scan circuit 210 operates as follows.

(a) Timing a

At timing a, when the voltage of a reset signal line CM_RST is turned to a high voltage, all the shift registers SRi (i=1 to n) are reset, and the voltages of the output signal lines SROUTi of all the shift registers SRi are turned to a low voltage. The switches SW3 and SW4 of the individual switch circuits CSWi (i=1 to n) are turned off. It is noted that an initialization circuit, not illustrated, turns off the switch SW1, and turns on the switch SW2.

(b) Timing b

At timing b, when the voltage of the start signal line CMST is turned to a high voltage, a high voltage is inputted to the shift register SRi (i=1).

(c) Timing c

At timing c, when the voltage of the clock signal line CMCK1 is turned to a high voltage, the high voltage of the start signal line CMST is transmitted to turn the output signal line SROUTi (i=1) of the shift register SRi (i=1) to a high voltage. Thus, the switch SW3 of the switch circuit CSWi (i=1) is turned on. Since the voltage of the first select signal line VCOMSEL1 is at a low voltage, the switch SW1 of the switch circuit CSWi (i=1) remains off. Moreover, the switch SW4 of the switch circuit CSWi (i=1) is turned on. Since the voltage of the second select signal line VCOMSEL2 is at a high voltage, the switch SW2 of the switch circuit CSWi (i=1) remains on. Furthermore, the high voltage of the output signal line SROUTi (i=1) is inputted to the shift register SRi (i=2).

(d) Timing d

At timing d, when the voltage of the second select signal line VCOMSEL2 is turned to a low voltage, the switch SW2 of the switch circuit CSWi (i=1) is turned off because the switch SW4 of the switch circuit CSWi (i=1) is on.

(e) Timing e

At timing e, when the voltage of the first select signal line VCOMSEL1 is turned to a high voltage, the switch SW1 of the switch circuit CSWi (i=1) is turned on because the voltage of the output signal line SROUTi (i=1) is at a high voltage, and the switch SW3 of the switch circuit CSWi (i=1) is on. Thus, the signal of the alternating current drive signal line VCOMAC can be outputted to the counter electrode signal line CLi (i=1) as the counter electrode signal Ci (i=1).

(f) Timing f

At timing f, the voltage of the alternating current drive signal line VCOMAC is turned to a high voltage, and then repeatedly turned to a high voltage and to a low voltage, and the signal is outputted to the counter electrode signal line CLi (i=1).

(g) Timing g

At timing g, when the voltage of the first select signal line VCOMSEL1 is turned to a low voltage, the switch SW1 of the switch circuit CSWi (i=1) is turned off because the voltage of the output signal line SROUTi (i=1) is at a high voltage, and the switch SW3 of the switch circuit CSWi (i=1) is on. Thus, the signal of the alternating current drive signal line VCOMAC is not outputted to the counter electrode signal line CLi (i=1) as the counter electrode signal Ci (i=1).

(h) Timing h

At timing h, when the voltage of the second select signal line VCOMSEL2 is turned to a high voltage, the switch SW2 of the switch circuit CSWi (i=1) is turned on because the switch SW4 of the switch circuit CSWi (i=1) is on. Thus, the signal of the direct current drive signal line VCOMDC is outputted to the counter electrode signal line CLi (i=1) as the counter electrode signal Ci (i=1).

(i) Timing i

At timing i, when the voltage of the clock signal line CMCK1 is turned to a low voltage, the voltage of the output signal line SROUTi (i=1) of the shift register SRi (i=1) is turned to a low voltage. Thus, the switches SW3 and SW4 of the switch circuit CSWi (i=1) are turned off.

(j) Timing j

At timing j, when the voltage of the clock signal line CMCK2 is turned to a high voltage, the high voltage of the output signal line SROUTi (i=1) is transmitted, and the voltage of the output signal SROUTi (i=2) of the shift register SRi (i=2) is turned to a high voltage. Thus, the switch SW3 of the switch circuit CSWi (i=2) is turned on. Since the voltage of the first select signal line VCOMSEL1 is at a low voltage, the switch SW1 of the switch circuit CSWi (i=2) is turned off. Moreover, the high voltage of the output signal line SROUTi (i=2) is inputted to the shift register SRi (i=3).

(k) From Timing j to Timing k

From timing j to timing k, the operations from timing d to timing j are repeated, and the counter electrode signal lines are scanned to the counter electrode signal line CLi (i=n). After timing k, the operations are the same as the operations at timing a and later.

Furthermore, the pixels are written between timing h and timing i.

<Switch Circuit>

(Configuration)

Figure 9:
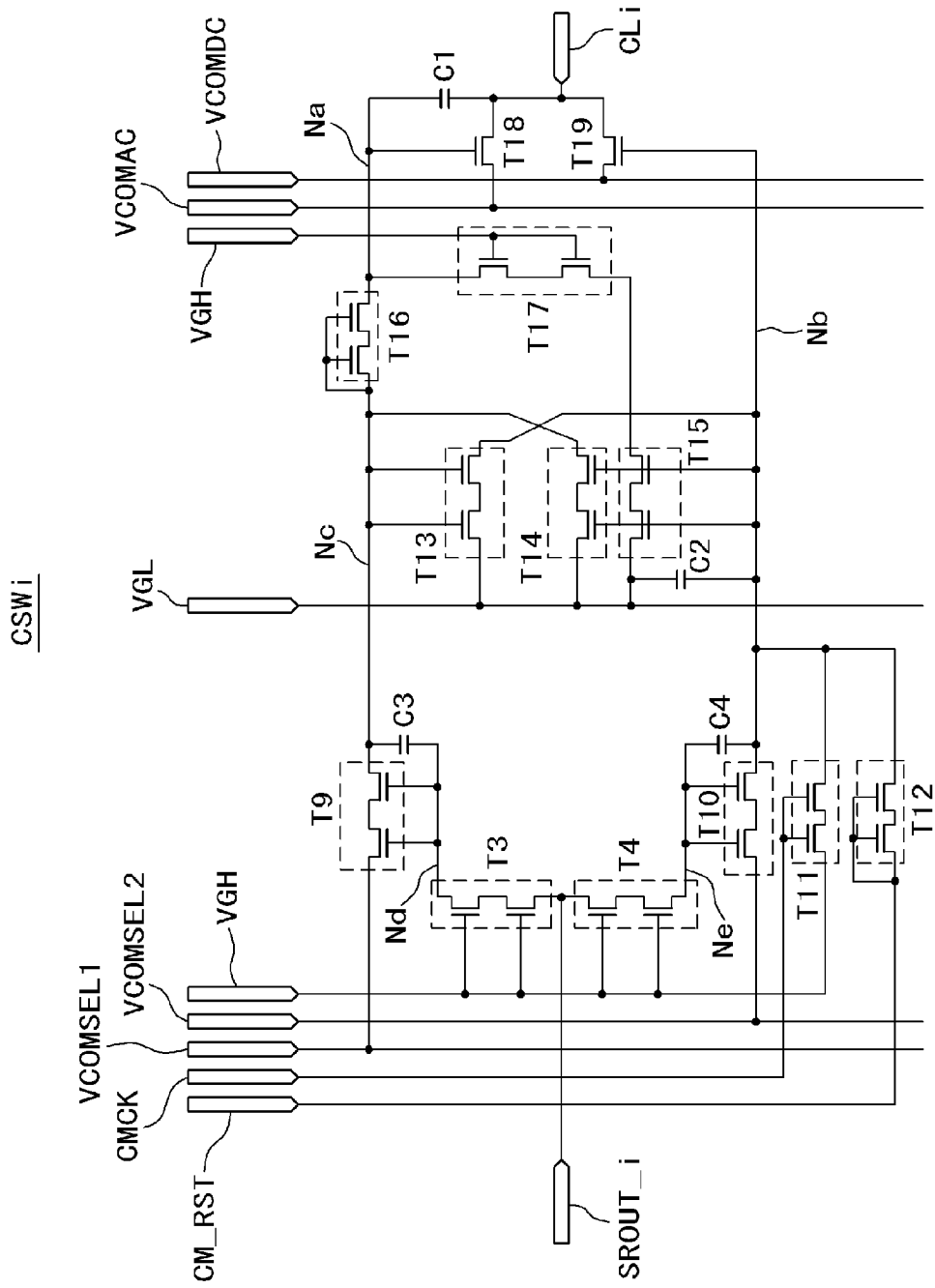
FIG. 9 is a detailed circuit diagram of a switch circuit according to the example.

FIG. 9 is a detailed circuit diagram of the switch circuit according to the example. The switch circuit CSWi (i=1 to n) includes thin film transistors T3, T4, T9, T10, T11, T12, T13, T14, T15, T16, T17, T18, and T19, and retention capacitances C1, C2, C3, and C4. The thin film transistors T3, T4, T9, T10, T11, T12, T13, T14, T15, T16, and T17 surrounded by a broken line are each configured in which two thin film transistors are connected to each other in series. However, in the following, in order to avoid a complicated description, the description is made as a single thin film transistor. The thin film transistor is provided to relax the voltage across the source and the drain. A withstand voltage across the source and the drain of the thin film transistor is a voltage of about 15 V. It is noted that the high voltage of the signals is at a voltage of 12 V, and a low voltage is at a voltage of −8 V except the signal of the alternating current drive signal line VCOMAC. The voltage of the signal of the direct current drive signal line VCOMDC is at a voltage from 0 V to 6 V. It may be fine that the alternating current drive signal line VCOMAC is driven at an amplitude between voltages of about 0 V and 5 V or driven at an amplitude between voltages of about 0 V and 10 V.

As illustrated in FIG. 9, in the output stage in which the counter electrode signal CLi (i=1 to n) is outputted, the thin film transistor (a first thin film transistor) T18 and the thin film transistor (a second thin film transistor) T19, which are alternately driven, are provided in parallel, and the output terminal of the counter electrode signal line CLi is connected to the second electrodes of the thin film transistor T18 and the thin film transistor T19. The thin film transistors T18 and T19 correspond to the switches SW1 and SW2 in FIG. 7. The first electrode of the thin film transistor T18 is connected to the alternating current drive signal line VCOMAC through which an alternating voltage is supplied to the counter electrode signal line CLi (i=1 to n). The first electrode of the thin film transistor T19 is connected to the direct current drive signal line VCOMDC through which a direct current voltage is supplied to the counter electrode signal line CLi (i=1 to n). The second electrode of the thin film transistor T18 is connected to the first electrode of the retention capacitance C1.

The second electrode of the retention capacitance C1 is connected to the gate electrode of the thin film transistor T18, the second electrode (the cathode electrode) of the diode-connected thin film transistor (a third thin film transistor) T16, and the first electrode of the thin film transistor T17. This connecting point is defined as a first node Na. The thin film transistor T16 and the retention capacitance C1 configure a booster circuit (a first circuit) that raises the voltage of the first node Na. The second electrode of the thin film transistor T17 is connected to the first electrode of the thin film transistor T15, and the gate electrode of the thin film transistor T17 is connected to a high voltage power supply line VGH. The second electrode of the thin film transistor T15 is connected to a low voltage power supply line VGL, and the gate electrode of the thin film transistor T15 is connected to a second node Nb. The thin film transistors T15 and T17 configure a discharge circuit (a reset circuit, which is a second circuit) that discharges the first node Na. The thin film transistor T17 is provided between the first node Na and the thin film transistor T15, so that the voltage across the source and the drain of the thin film transistor T15 can be absorbed.

The first electrode (the anode electrode) of the thin film transistor T16 is connected to the second electrode of the thin film transistor (a fourth thin film transistor) T9, the first electrode of the retention capacitance C3, and the first electrode of the thin film transistor T14. The first electrode of the thin film transistor T9 is connected to the first select signal line VCOMSEL1, and the gate electrode is connected to the second electrode of the retention capacitance C3. The thin film transistor T9 corresponds to the switch SW3 in FIG. 7. The second electrode of the retention capacitance C3 is connected to the second electrode of the thin film transistor (a sixth thin film transistor) T3. The first electrode of the thin film transistor T3 is connected to the output signal line SROUT_i, the gate electrode is connected to the high voltage power supply line VGH, and the second electrode is connected to the gate electrode of the thin film transistor T9. The thin film transistor T3 configures an input circuit. The second electrode of the thin film transistor T14 is connected to the low voltage power supply line VGL, and the gate electrode is connected to the second node Nb. The thin film transistor T14 configures a discharge circuit (a reset circuit, which is a fourth circuit) that discharges a third node Nc.

The gate electrode of the thin film transistor T19 is connected to the first electrode of the retention capacitance C2, the first electrode of the retention capacitance C4, the second electrode of the thin film transistor (a fifth thin film transistor) T10, the second electrode of the thin film transistor T11, the second electrode (the cathode electrode) of the diode-connected thin film transistor T12, and the first electrode of the thin film transistor T13. The second electrode of the retention capacitance C2 is connected to the low voltage power supply line VGL. The first electrode of the thin film transistor T10 is connected to the second select signal line VCOMSEL2, and the gate electrode is connected to the second electrode of the retention capacitance C4. The thin film transistor T10 corresponds to the switch SW4 in FIG. 7. The second electrode of the retention capacitance C4 is connected to the second electrode of the thin film transistor (a seventh thin film transistor) T4. The first electrode of the thin film transistor T4 is connected to the output signal line SROUT_i, the gate electrode is connected to the high voltage power supply line VGH, and the second electrode is connected to the gate electrode of the thin film transistor T10. The thin film transistor T4 configures an input circuit. The thin film transistor T13 configures a discharge circuit (a reset circuit, which is a third circuit) that discharges the second node Nb.

The first electrode of the thin film transistor T11 is connected to the high voltage power supply line VGH, and the gate electrode is connected to the clock signal line CMCK. The negative-phase signal of any one signal of the clock signal line CMCK1 and the clock signal line CMCK2 is transmitted to the clock signal line CMCK, in which the negative-phase signal of the signal of the clock signal line CMCK1 is transmitted when i is an odd number, whereas the negative-phase signal of the signal of the clock signal line CMCK2 is transmitted when i is an even number. The first electrode (the anode electrode) of the thin film transistor T12 is connected to the reset signal line CM_RST. The second electrode of the thin film transistor T13 is connected to the low voltage power supply line VGL, and the gate electrode is connected to the third node Nc. The thin film transistor T11 and the thin film transistor T12 configure a charge circuit (an initialization circuit, which is a fifth circuit) that charges the retention capacitance C2 (the second node Nb). The thin film transistor T13 configures a discharge circuit (a reset circuit, which is a sixth circuit) that discharges the second node Nb.

(Operation)

In the following, the operation of the switch circuit CSWi (i=1 to n) will be described with reference to the timing chart in FIG. 8.

(a) Timing a

At timing a, when the voltage of the reset signal line CM_RST is turned to a high voltage, the voltages of all the output signal lines SROUTi are turned to a low voltage. The thin film transistors T3 and T4 are turned to the ON-state, and the voltages of the fourth Nd and the fifth node Ne are turned to a low voltage by the low voltage of the output signal line SROUTi. The thin film transistors T9 and T10 are turned to the OFF-state. The high voltage of the reset signal line CM_RST is transmitted to the second node Nb through the thin film transistor T12 to charge the retention capacitance C2. The voltage of the first node Na is turned to a low voltage by the thin film transistors T15 and T17. Moreover, the voltage of the third node Nc is turned to a low voltage by the thin film transistor T14. The thin film transistor T18 is turned to the OFF-state, and the thin film transistor T19 is turned to the ON-state. Therefore, the signal of the direct current drive signal line VCOMDC is outputted to the counter electrode signal line CLi (i=1 to n).

(b) Timing c

At timing c, when the voltage of the clock signal line CMCK (CMCK1) is turned to a high voltage, the voltage of the output signal line SROUTi (i=1) is turned to a high voltage. Thus, the retention capacitance C3 is charged through the thin film transistor T3, and the thin film transistor T9 is turned to the ON-state. Since the voltage of the first select signal line VCOMSEL1 is at a low voltage, the thin film transistor T18 remains on the OFF-state. Moreover, the retention capacitance C4 is charged through the thin film transistor T4, and the thin film transistor T10 is turned to the ON-state. Since the voltage of the second select signal line VCOMSEL2 is at a high voltage, the thin film transistor T19 remains in the ON-state. Therefore, the signal of the direct current drive signal line VCOMDC is outputted to the counter electrode signal line CLi (i=1 to n).

(c) Timing d

At timing d, when the voltage of the second select signal line VCOMSEL2 is turned to a low voltage, the fourth node Nb is discharged, and the thin film transistor T19 is turned to the OFF-state because the thin film transistor T10 of the switch circuit CSWi (i=1) is in the ON-state.

(d) Timing e

At timing e, when the voltage of the first select signal line VCOMSEL1 is turned to a high voltage, the retention capacitance C3 raises the gate voltage of the thin film transistor T9 of the switch circuit CSWi (i=1), and a high voltage with no voltage drop is applied to the third node Nc. The high voltage of the third node Nc is applied to the gate of the thin film transistor T18 and the retention capacitance C1 by the thin film transistor T16, and the retention capacitance C1 is charged. Thus, the thin film transistor T18 is turned to the ON-state, and the signal of the alternating current drive signal line VCOMAC can be outputted to the counter electrode signal line CLi (i=1).

(e) Timing f

At timing f, the voltage of the alternating current drive signal line VCOMAC is turned to a high voltage, so that the retention capacitance C1 raises the gate voltage of the thin film transistor T18 of the switch circuit CSWi (i=1), and a high voltage with no voltage drop is outputted to the counter electrode signal line CLi (i=1). Since the voltage of the first node Na is maintained at a high voltage by the retention capacitance C1, the gate voltage of the thin film transistor T18 is raised by the retention capacitance C1 every time when the voltage of the alternating current drive signal line VCOMAC is turned to a high voltage, and a high voltage with no voltage drop is outputted to the counter electrode signal line CLi (i=1).

The alternating current drive signal line VCOMAC is an alternating current signal line that oscillates between 0 V and 5 V, for example, and the high voltages of the first select signal line VCOMSEL1 and the second select signal line VCOMSEL2 are a voltage of 12 V. Therefore, the gate voltage of the thin film transistor T18 in the case where the high voltage of the alternating current drive signal line VCOMAC is outputted to the counter electrode signal line CL is raised to a voltage of about 17 V.

In the case where the gate voltage of the thin film transistor T18 is raised, a voltage exceeding a withstand voltage is applied across the source and the drain of the thin film transistor T15 that discharges the first node Na. The thin film transistor T17 is provided between the first node Na and the thin film transistor T15, so that the voltage across the source and the drain of the thin film transistor T15 can be absorbed.

(f) Timing g

At timing g, when the voltage of the first select signal line VCOMSEL1 is turned to a low voltage, the voltage of the output signal line SROUTi (i=1) is at a high voltage, the thin film transistor T9 of the switch circuit CSWi (i=1) is in the ON-state, and the voltage of the third node Nc is turned to a low voltage However, since the diode-connected thin film transistor T16 is provided, the voltage of the first node Na is not turned to a low voltage. Therefore, the thin film transistor T18 remains in the ON-state.

(g) Timing h

At timing h, when the voltage of the second select signal line VCOMSEL2 is turned to a high voltage, the retention capacitance C4 raises the gate voltage of the thin film transistor T10 of the switch circuit CSWi (i=1), a high voltage with no voltage drop is applied to the second node Nb, and the thin film transistor T19 is turned to the ON-state. Moreover, when the voltage of the second node Nb is turned to a high voltage, the thin film transistors T15 and T17 turn the voltage of the first node Na to a low voltage, and the thin film transistor T18 is turned to the OFF-state. Furthermore, the voltage of the third node Nc is also turned to a low voltage by the thin film transistor T14. Thus, the signal of the direct current drive signal line VCOMDC is outputted to the counter electrode signal line CLi (i=1).

(h) Timing i

At timing i, when the voltage of the clock signal line CMCK1 is turned to a low voltage, the voltage of the output signal line SROUTi (i=1) is turned to a low voltage. Thus, the thin film transistors T9 and T10 of the switch circuit CSWi (i=1) are turned to the OFF-state. When the voltage of the clock signal line CMCK1 is turned to a low voltage, the voltage of the negative-phase clock signal CMCK is turned to a high voltage, the retention capacitance C2 is charged by the thin film transistor T11, the voltage of the second node Nb is turned to a high voltage, and the thin film transistor T19 remains in the ON-state. Thus, the signal of the direct current drive signal line VCOMDC is kept outputted to the counter electrode signal line CLi (i=1).

The booster circuit configured of the thin film transistor T16 and the retention capacitance C1 can raise the voltage of the first node Na when the high voltage of the drive signal line VCOMAC is transmitted through the thin film transistor T18, so that the drive power can be improved even using a single-channel thin film transistor. The booster circuit is provided on the thin film transistor T18 side, and the booster circuit is not provided on the thin film transistor T19 side, so that the circuit scale can be made smaller. The signal of the drive signal line VCOMAC necessary to sense a touch can be outputted with no voltage drop, so that the accuracy of touch detection can be improved. The high voltages of the signals are at a voltage of 12 V and the low voltages are at a voltage of −8 V, whereas the voltage of the signal of the direct current drive signal line VCOMDC is at a voltage between voltages of 0 V to 6 V, so that the signal of the direct current drive signal line VCOMDC is outputted with no voltage decay even though the voltage is not raised in driving the gate of the thin film transistor T19.

First Exemplary Modification

Figure 10:
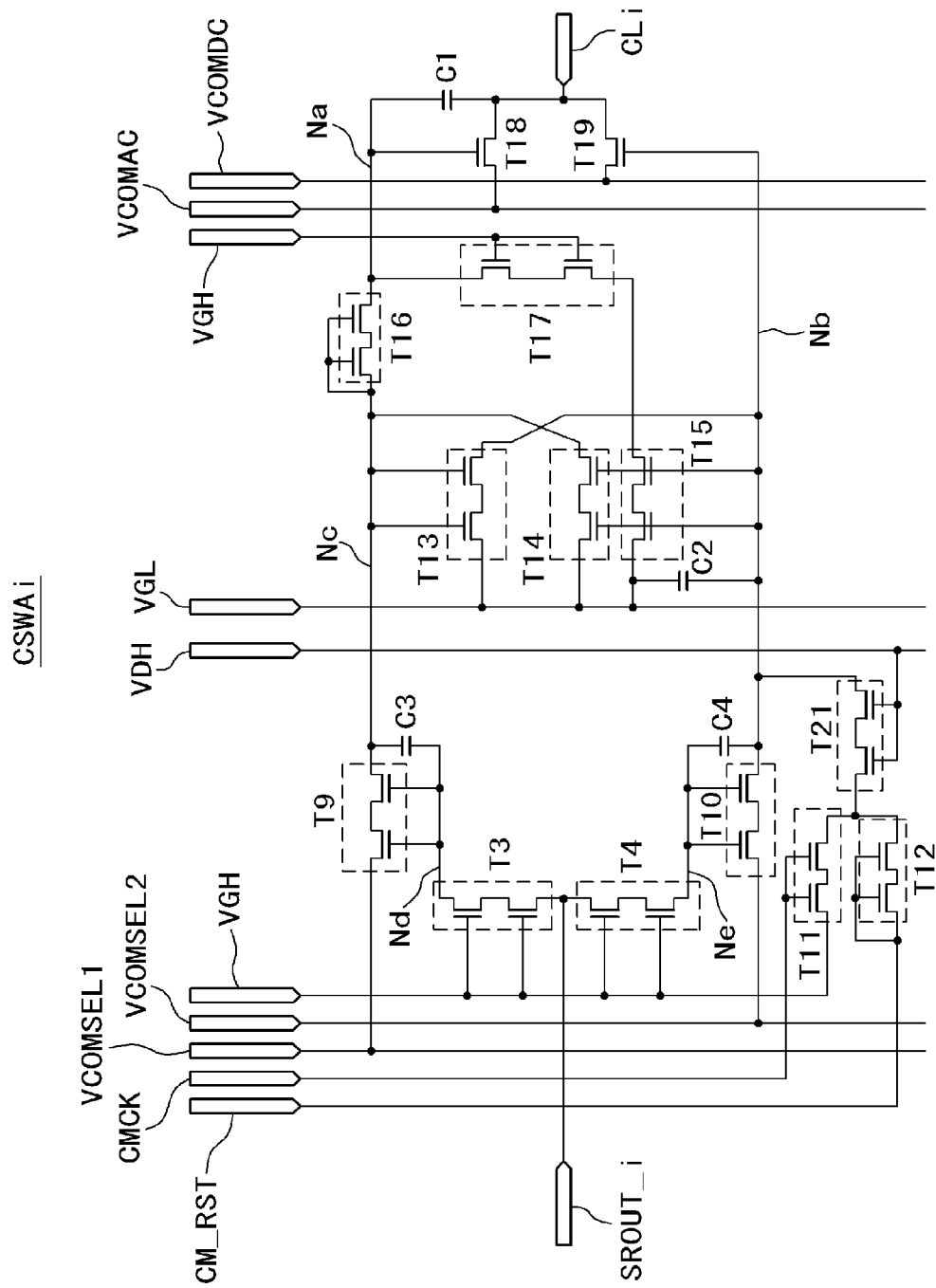
FIG. 10 is a detailed circuit diagram of a switch circuit according to a first exemplary modification.

FIG. 10 is a detailed circuit diagram of a switch circuit according to a first exemplary modification. A switch circuit CSWAi according to the first exemplary modification is that a thin film transistor T21 that relaxes the voltage across the source and the drain is added to the switch circuit CSWi according to the example in FIG. 9. The thin film transistor T21 is disposed among the second node Nb, the second electrode of the thin film transistor T11, and the second electrode of the thin film transistor T12. The gate electrode of the thin film transistor T21 is connected to the high voltage power supply line VDH. A voltage applied to the high voltage power supply line VDH is lower than a voltage applied to the high voltage power supply line VGH. Thus, the voltage across the source and the drain of the thin film transistor T11 and the voltage across the source and the drain of the thin film transistor T12 can be absorbed. The configurations other than the description above are the same as the configurations of the switch circuit CSWi in FIG. 9, and the overlapping description is omitted.

Second Exemplary Modification

Figure 11:
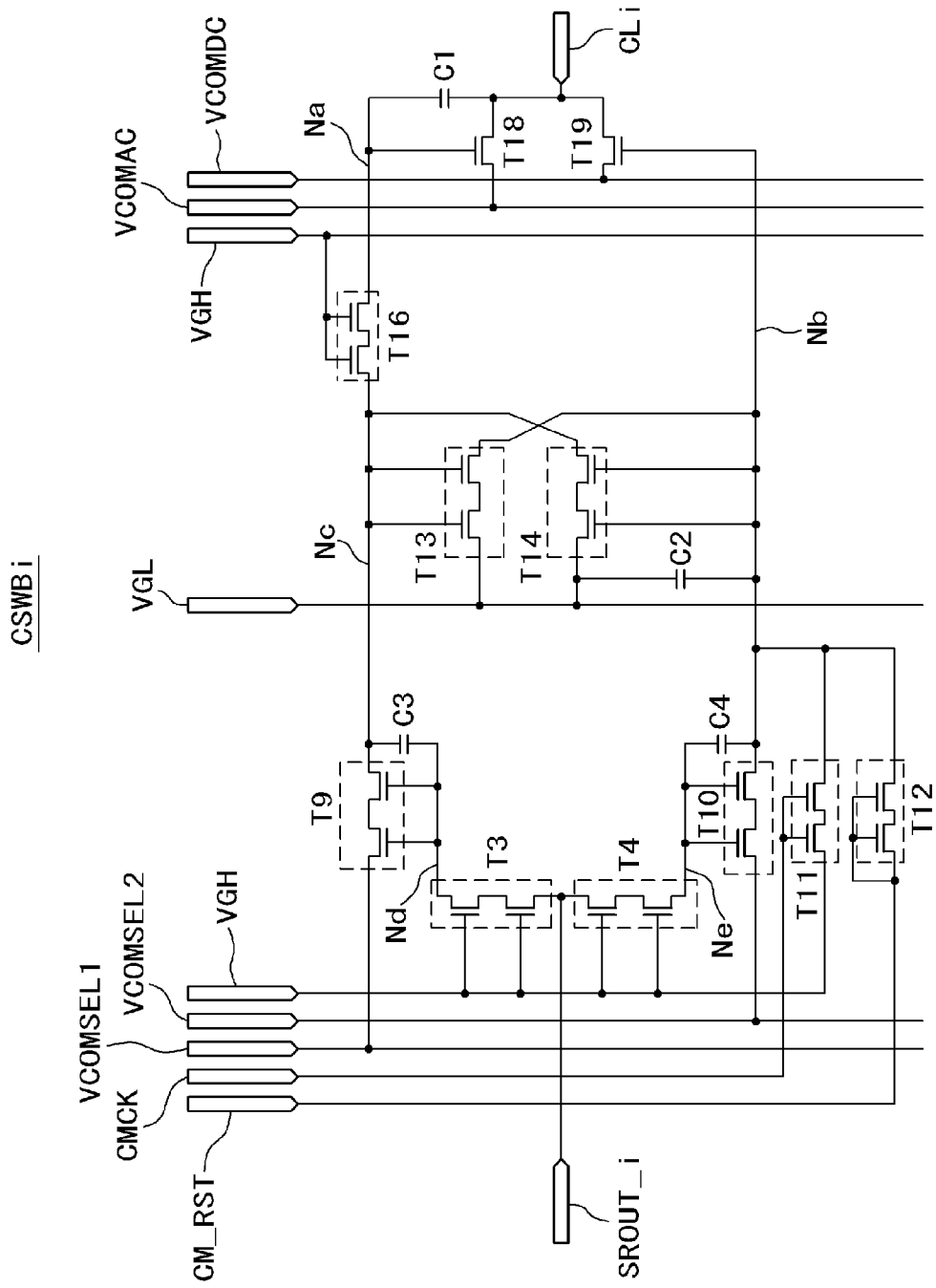
FIG. 11 is a detailed circuit diagram of a switch circuit according to a second exemplary modification.

FIG. 11 is a detailed circuit diagram of a switch circuit according to a second exemplary modification. A switch circuit CSWBi according to the second exemplary modification is that the connection of the gate electrode of the thin film transistor T16 is modified with respect to the switch circuit CSWi according to the example in FIG. 9. The gate electrode of the thin film transistor T16 is connected to the high voltage power supply line VGH. When the voltage of the third node Nc is turned to a high voltage, the first node Na is charged through the thin film transistor T16. The voltage of the alternating current drive signal line VCOMAC is turned to a high voltage, so that the gate voltage of the thin film transistor T18 is raised by the retention capacitance C1, and a high voltage with no voltage drop is outputted to the counter electrode signal line CLi (i=1). The thin film transistor T16 can carry an electric current to both sides, so that the first node Na and the third node Nc can conduct electricity. Therefore, the thin film transistors T15 and T17 that configure the discharge circuit in the switch circuit CSWi are unnecessary. Thus, the switch circuit can be downscaled. The configurations other than the description above are the same as the configurations of the switch circuit CSWi in FIG. 9, and the overlapping description is omitted.

Third Exemplary Modification

Figure 12:
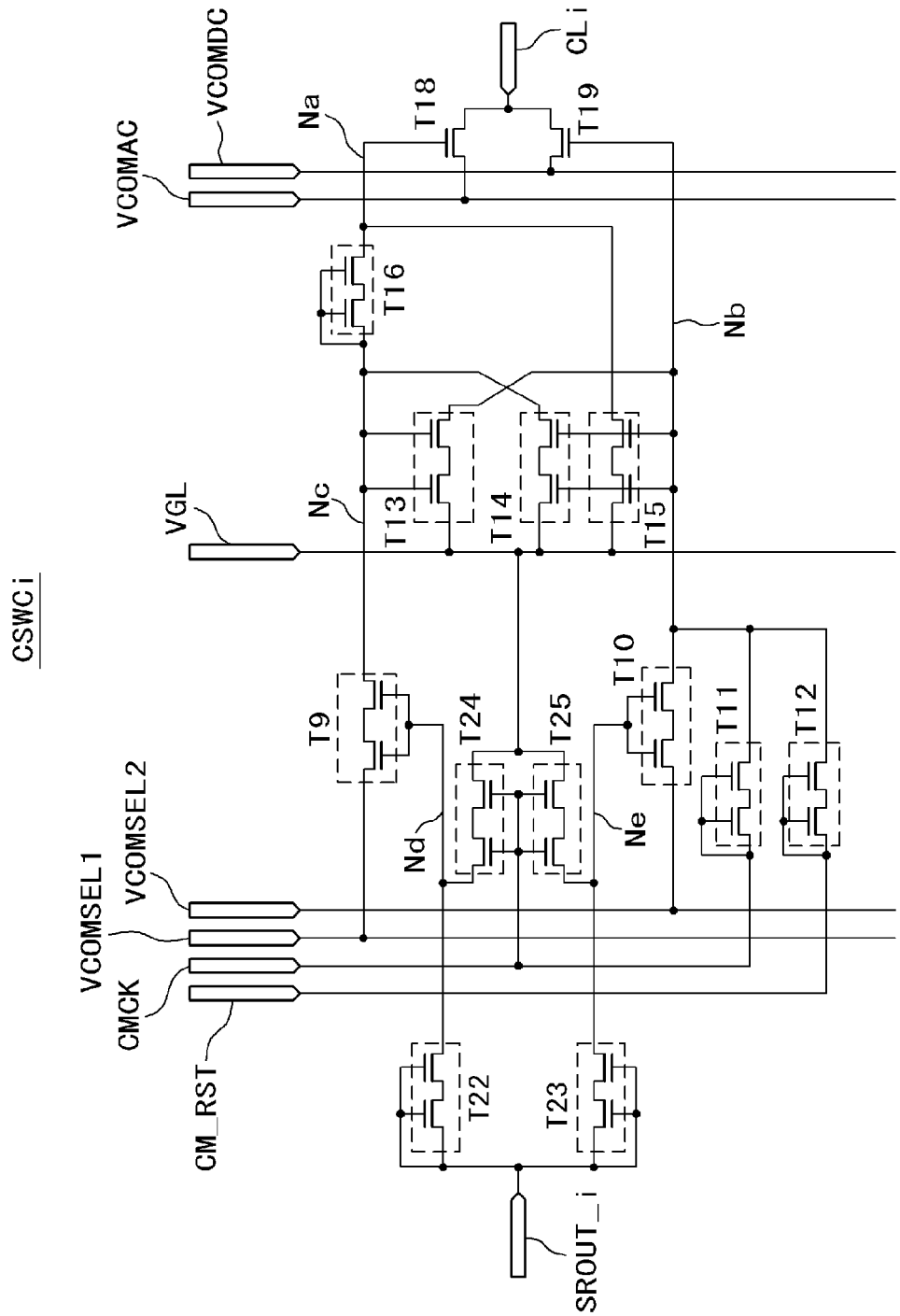
FIG. 12 is a detailed circuit diagram of a switch circuit according to a third exemplary modification.

FIG. 12 is a detailed circuit diagram of a switch circuit according to a third exemplary modification. A switch circuit CSWCi according to the third exemplary modification is that the input circuit from the output signal line SROUT_i is modified with respect to the switch circuit CSWi according to the example in FIG. 9. In other words, diode-connected thin film transistors T22 and T23 are used instead of the thin film transistors T3 and T4. The thin film transistors T22 and T23 configure an input circuit. Therefore, a discharge circuit (a reset circuit) is necessary to discharge the fourth node Nd and the fifth node Ne, and thin film transistors T24 and T25 are added.

The first electrode (the anode) of the diode-connected thin film transistor (the sixth thin film transistor) T22 and the first electrode (the anode) of the diode-connected thin film transistor (the seventh thin film transistor) T23 are connected to the output signal line SROUT_i. Moreover, the second electrode (the cathode electrode) of the thin film transistor T22 is connected to the gate electrode of the thin film transistor T9 and the first electrode of the thin film transistor T24. Furthermore, the second electrode of the thin film transistor T24 is connected to the low voltage power supply line VGL, and the gate electrode is connected to the clock signal line CMCK. In addition, the second electrode (the cathode electrode) of the thin film transistor T23 is connected to the gate electrode of the thin film transistor T10 and the first electrode of the thin film transistor T25. Moreover, the second electrode of the thin film transistor T25 is connected to the low voltage power supply line VGL, and the gate electrode is connected to the clock signal line CMCK.

A modified point other than the input circuit is that the switch circuit CSWCi is not connected to the high voltage power supply line VGH. In other words, the thin film transistor T17 is also eliminated, and the first electrode of the thin film transistor T15 is connected to the first node Na. Furthermore, the thin film transistor T11 is in diode connection, and the first electrode (the anode electrode) is connected to the clock signal line CMCK.

The configurations other than the description above are the same as the configurations of the switch circuit CSWi, and the overlapping description is omitted. It is noted that although the retention capacitances C1, C2, C3, and C4 are not illustrated, the switch circuit CSWCi includes the retention capacitances C1, C2, C3, and C4 at the same locations as the locations of the switch circuit CSWi. In other words, the first electrode of the retention capacitance C1 is connected to the second electrode of the thin film transistor T18, and the second electrode is connected to the first node Na. The first electrode of the retention capacitance C2 is connected to the second node Nb, and the second electrode is connected to the low voltage power supply line VGL. The first electrode of the retention capacitance C3 is connected to the third node Nc, and the second electrode is connected to the fourth node Nd. The first electrode of the retention capacitance C4 is connected to the second node Nb, and the second electrode is connected to the fifth node Ne. Moreover, in the following, the points different from the operation of the switch circuit CSWi will be described.

At timing c, when the voltage of the output signal line SROUTi (i=1) is turned to a high voltage, a high voltage is applied to the gate of the thin film transistor T9 and the retention capacitance C3 by the thin film transistor T229 and, the retention capacitance C3 is charged, and the thin film transistor T9 is turned to the ON-state. Since the voltage of the first select signal line VCOMSEL1 is at a low voltage, the thin film transistor T18 remains on the OFF-state. Moreover, a high voltage is applied to the gate of the thin film transistor T10 and the retention capacitance C4 by the thin film transistor T23, the retention capacitance C4 is charged, and the thin film transistor T10 is turned to the ON-state. Since the voltage of the second select signal line VCOMSEL2 is at a high voltage, the thin film transistor T19 remains in the ON-state. Therefore, the signal of the direct current drive signal line VCOMDC is outputted to the counter electrode signal line CLi (i=1 to n).

At timing i, when the voltage of the clock signal line CMCK1 is turned to a low voltage, the voltage of the output signal line SROUTi (i=1) is turned to a low voltage, but the voltages of the fourth node Nd and the fifth node Ne are not turned to a low voltage. At timing j, when the voltage of the clock signal line CMCK1 in the negative-phase is turned to a low voltage, the voltage of the clock signal CMCK is turned to a high voltage, and the voltages of the fourth node Nd and the fifth node Ne are turned to a low voltage by the thin film transistors T24 and T25. Thus, the thin film transistors T9 and T10 are turned to the OFF-state.

In the switch circuit CSWi, when the voltage of the output signal line SROUTi is at a high voltage, the fourth node Nd and the fifth node Ne conduct electricity. It is necessary that the voltage of the second select signal line VCOMSEL2 is first turned to a low voltage, then the voltage of the first select signal line VCOMSEL1 is turned to a high voltage, and the voltage of the gate electrode of the thin film transistor T9 is raised. On the other hand, in the switch circuit CSWCi, since the diode-connected thin film transistors T22 and T23 isolate the fourth node Nd from the fifth node Ne, it is unnecessary to consider the phase difference between the first select signal line VCOMSEL1 and the second select signal line VCOMSEL2, and the circuit design is easy.

Fourth Exemplary Modification

Figure 13:
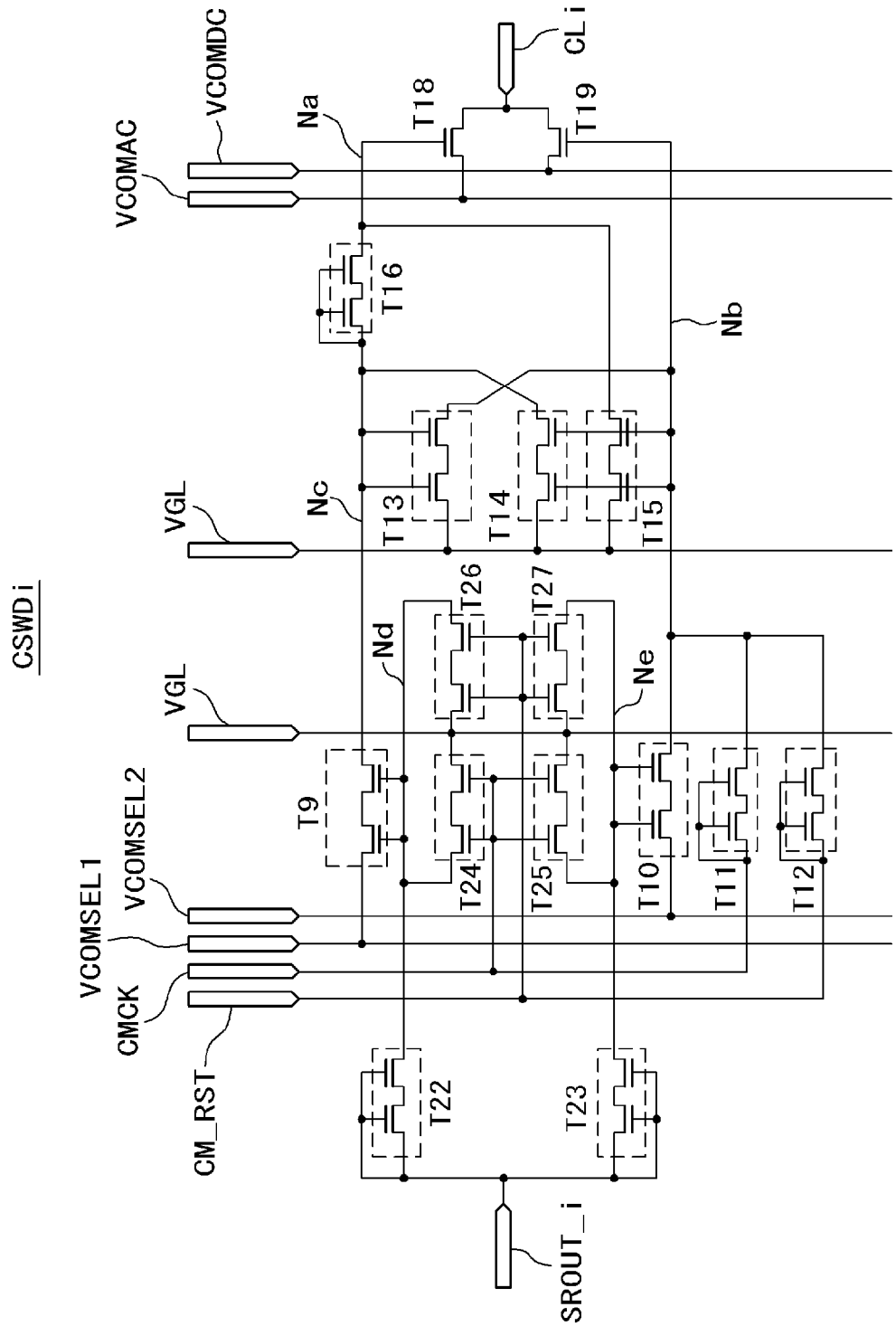
FIG. 13 is a detailed circuit diagram of a switch circuit according to a fourth exemplary modification.

FIG. 13 is a detailed circuit diagram of a switch circuit according to a fourth exemplary modification. A switch circuit CSWDi according to the fourth exemplary modification is that an initialization circuit is added to the switch circuit CSWCi according to the third exemplary modification in FIG. 12. In other words, thin film transistors T26 and T27 are added. The first electrode of the thin film transistor T26 is connected to the fourth node Nd, the gate electrode is connected to the reset signal line CM_RST, and the second electrode is connected to the low voltage power supply line VGL. Moreover, the first electrode of the thin film transistor T27 is connected to the fifth node Ne, the gate electrode is connected to the reset signal line CM_RST, and the second electrode is connected to the low voltage power supply line VGL. In the initial state, when the voltage of the signal of the reset signal line CM_RST is turned to a high voltage, the voltages of the gate electrodes of the thin film transistors T9 and T10 are turned to a low voltage for initialization, so that the stability of the circuit can be improved. The configurations other than the description above are the same as the configurations of the switch circuit CSWCi, and the overlapping description is omitted. It is noted that although the retention capacitances C1, C2, C3, and C4 are not illustrated, the switch circuit CSWDi includes the retention capacitances C1, C2, C3, and C4 at the same locations as the locations of the switch circuit CSWi, which is also the same as the switch circuit CSWCi.

Fifth Exemplary Modification

Figure 14:
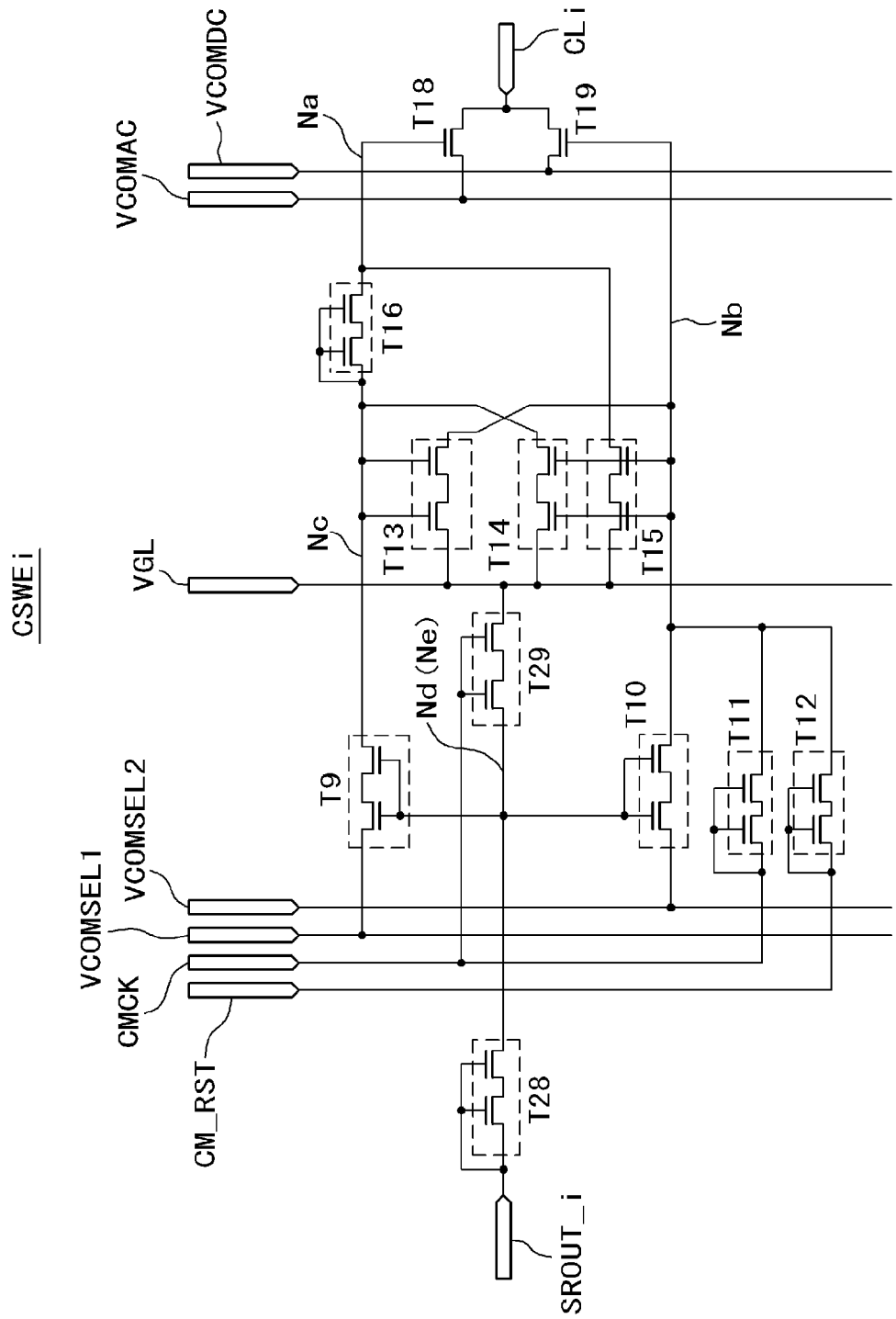
FIG. 14 is a detailed circuit diagram of a switch circuit according to a fifth exemplary modification.

FIG. 14 is a detailed circuit diagram of a switch circuit according to a fifth exemplary modification. A switch circuit CSWEi according to the fifth exemplary modification is that the input unit from the output signal line SROUT_i is simplified with respect to the switch circuit CSWCi according to the third exemplary modification in FIG. 12. In other words, the two thin film transistors T22 and T23 are modified into a single thin film transistor T28, the two thin film transistors T24 and T25 are modified into a single thin film transistor T29, and the two low voltage power supply lines VGL are modified into a single low voltage power supply line VGL.

The first electrode (the anode electrode) of the diode-connected thin film transistor T28 is connected to the output signal line SROUT_i. Moreover, the second electrode (the cathode electrode) of the thin film transistor T28 is connected to the gate electrode of the thin film transistor T9, the gate electrode of the thin film transistor T10, and the first electrode of the thin film transistor T29. Furthermore, the second electrode of the thin film transistor T29 is connected to the low voltage power supply line VGL, and the gate is connected to the clock signal line CMCK. The circuit is simplified as compared with the switch circuit CSWCi, and the circuit scale can be downscaled. The configurations other than the description above are the same as the configurations of the switch circuit CSWCi, and the overlapping description is omitted. It is noted that although the retention capacitances C1, C2, C3, and C4 are not illustrated, the switch circuit CSWEi includes the retention capacitances C1, C2, C3, and C4 at the same locations as the locations of the switch circuit CSWi, which is also the same as the switch circuit CSWCi.

As described above, the invention made by the present inventors is described with reference to the embodiment, the example, and the exemplary modifications. However, the present invention is not limited to the embodiment, the example, and the exemplary modifications, and it is without saying that the present invention can be variously modified and altered.

What is claimed is:
1. A display device comprising:
an electrode shared by a display electrode and a touch sensing electrode; and
a drive circuit configured to drive the electrode, wherein:
the drive circuit is configured of a single-channel thin film transistor and includes a first thin film transistor connected to the electrode and a second thin film transistor connected to the electrode;
the first thin film transistor has a terminal to which a first signal is inputted, and a gate electrode to which control signal is applied when transmitting the first signal to the electrode, the second thin film transistor has a terminal to which a second signal is inputted, and a gate electrode to which control signal is applied when transmitting the first signal to the electrode, the first thin film transistor conducts electricity when using the electrode for sensing a touch and transmits the first signal to the electrode;

the second thin film transistor conducts electricity when using the electrode for display and transmits the second signal to the electrode; and a voltage of the control signal when the first thin film transistor transmits the first signal is greater than a voltage of the control signal when the second thin film transistor transmits the second signal.

2. A display device comprising:

an electrode shared by a display electrode and a touch sensing electrode;

a drive circuit configured to drive the electrode; and a first circuit configured to raise a voltage of the gate electrode of the first thin film transistor, wherein: the drive circuit is configured of a single-channel thin film transistor and includes a first thin film transistor connected to the electrode and a second thin film transistor connected to the electrode;

the first thin film transistor conducts electricity when using the electrode for sensing a touch and transmits a first signal to the electrode;

the second thin film transistor conducts electricity when using the electrode for display and transmits a second signal to the electrode;

a voltage applied to a gate electrode of the first thin film transistor when the first thin film transistor transmits the first signal is greater than a voltage applied to a gate electrode of the second thin film transistor when the second thin film transistor transmits the second signal; and the first circuit raises a voltage applied to the gate electrode of the first thin film transistor when the first thin film transistor transmits the first signal more than a voltage applied to the gate electrode of the second thin film transistor when the second thin film transistor transmits the second signal.

3. The display device according to claim 2, wherein: the first circuit is configured of a third diode-connected thin film transistor; and a cathode electrode of the third thin film transistor is connected to the gate electrode of the first thin film transistor.

4. The display device according to claim 3, further comprising:

a second circuit configured to discharge a first node at which the gate electrode of the first thin film transistor is connected to the cathode electrode of the third thin film transistor.

5. The display device according to claim 4, further comprising:

a fourth thin film transistor; and a fifth thin film transistor, wherein: an output signal of a shift register is applied to gate electrodes of the fourth thin film transistor and the fifth thin film transistor;

a first electrode of the fourth thin film transistor is connected to a first select signal line to select a touch drive signal;

a second electrode of the fourth thin film transistor is connected to an anode electrode of the third thin film transistor;

a first electrode of the fifth thin film transistor is connected to a second select signal line to select a display counter voltage; and a second electrode of the fifth thin film transistor is connected to the gate electrode of the second thin film transistor.

6. The display device according to claim 5, further comprising:

a third circuit configured to discharge a second node at which the gate electrode of the second thin film transistor is connected to one of the electrodes of the fifth thin film transistor; and a fourth circuit configured to discharge a third node at which the anode electrode of the third thin film transistor is connected to the second electrode of the fourth thin film transistor.

7. The display device according to claim 6, further comprising:

a fifth circuit configured to initialize the second node; and a sixth circuit configured to stabilize the second node.

8. The display device according to claim 7, further comprising:

an input circuit configured to receive an output signal of the shift register, wherein the input circuit is connected to the gate electrodes of the fourth thin film transistor and the fifth thin film transistor.

9. The display device according to claim 8, wherein: the input circuit includes a sixth thin film transistor and a seventh thin film transistor;

a first electrode of the sixth thin film transistor is connected to an output signal line of the shift register;

a second electrode of the sixth thin film transistor is connected to a gate electrode of the fourth thin film transistor;

a first electrode of the seventh thin film transistor is connected to the output signal line of the shift register; and a second electrode of the seventh thin film transistor is connected to a gate electrode of the fifth thin film transistor.

10. The display device according to claim 9, wherein: the first electrode is connected to a gate electrode of the sixth thin film transistor; and the first electrode is connected to a gate electrode of the seventh thin film transistor.

11. The display device according to claim 2, wherein: the drive circuit is disposed on both sides of the electrode; and the electrode is driven by the drive circuits disposed on both sides.

12. A display device comprising:

a pixel thin film transistor;

a counter electrode shared by a display electrode and a touch sensing electrode; and a drive circuit configured to drive the counter electrode, wherein: the drive circuit is configured of a thin film transistor of a channel type the same as a channel type of the pixel thin film transistor and includes a first thin film transistor connected to the counter electrode, a second thin film transistor connected to the counter electrode, and a first circuit configured to raises a voltage of a gate electrode of the first thin film transistor;

the first thin film transistor conducts electricity when using the counter electrode for sensing a touch, and transmits a drive signal to the counter electrode;

the second thin film transistor conducts electricity when using the counter electrode for display, and transmits a counter voltage to the counter electrode; and a voltage applied to the gate electrode of the first thin film transistor when the first thin film transistor transmits the drive signal is greater than a voltage applied to a gate electrode of the second thin film transistor when the second thin film transistor transmits the counter voltage.

13. The display device according to claim 12, wherein: the first circuit is configured of a third diode-connected thin film transistor; and a cathode electrode of the third thin film transistor is connected the gate electrode of the first thin film transistor.

14. The display device according to claim 13, further comprising:

a fourth thin film transistor; and a fifth thin film transistor, wherein: an input circuit to which an output signal of a shift register is applied is connected to gate electrodes of the fourth thin film transistor and the fifth thin film transistor;

a first electrode of the fourth thin film transistor is connected to a first select signal line to select a touch drive signal;

a second electrode of the fourth thin film transistor is connected to an anode electrode of the third thin film transistor;

a first electrode of the fifth thin film transistor is connected to a second select signal line to select a display counter voltage; and a second electrode of the fifth thin film transistor is connected to the gate electrode of the second thin film transistor.

15. The display device according to claim 14, further comprising:

a second circuit configured to discharge a first node at which the gate electrode of the first thin film transistor is connected to the cathode electrode of the third thin film transistor.

16. The display device according to claim 15, further comprising:

a third circuit configured to discharge a second node at which the gate electrode of the second thin film transistor is connected to one of the electrodes of the fifth thin film transistor; and a fourth circuit configured to discharge a third node at which the anode electrode of the third thin film transistor is connected to the second electrode of the fourth thin film transistor.

17. The display device according to claim 16, further comprising:

a fifth circuit configured to initialize the second node; and a sixth circuit configured to stabilize the second node.

18. The display device according to claim 14, wherein: the input circuit includes a sixth thin film transistor and a seventh thin film transistor;

a first electrode of the sixth thin film transistor is connected to an output signal line of the shift register;

a second electrode of the sixth thin film transistor is connected to a gate electrode of the fourth thin film transistor;

a first electrode of the seventh thin film transistor is connected to the output signal line of the shift register; and a second electrode of the seventh thin film transistor is connected to a gate electrode of the fifth thin film transistor.

19. The display device according to claim 18, wherein: the first electrode is connected to a gate electrode of the sixth thin film transistor; and the first electrode is connected to a gate electrode of the seventh thin film transistor.

20. The display device according to claim 12, wherein: the drive circuit is disposed on both sides of the counter electrode; and the counter electrode is driven by the drive circuits disposed on both sides.

* * * * *